March 20, 1951          D. G. GRISWOLD          2,545,774
ROTARY FLUID MOTOR AND VALVE MEANS
FOR CONTROLLING THE SAME
Filed Feb. 25, 1946          11 Sheets-Sheet 1
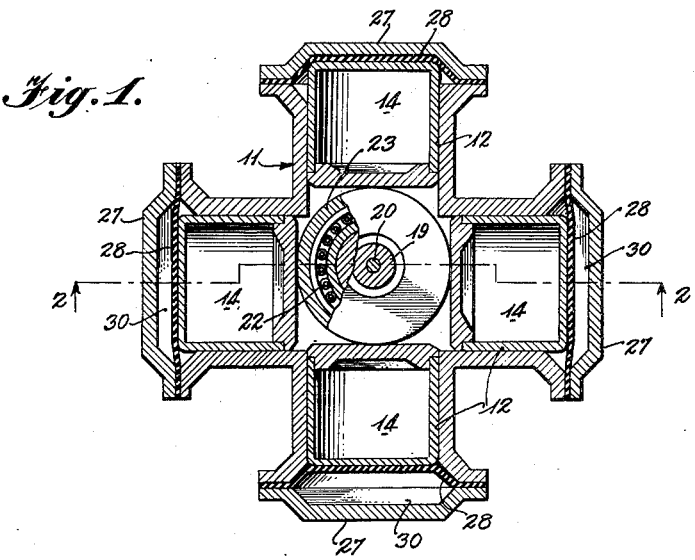
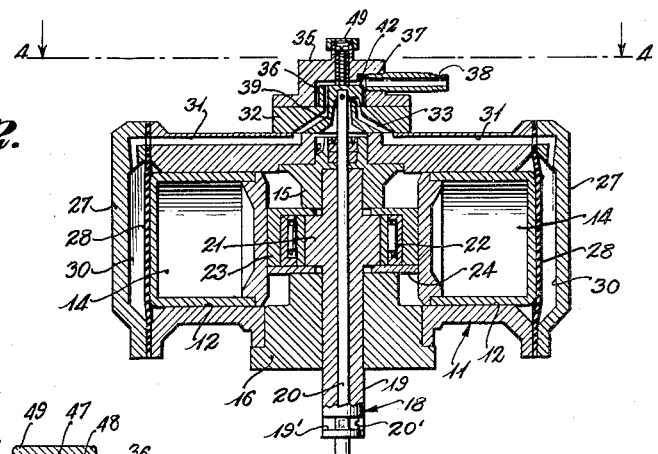
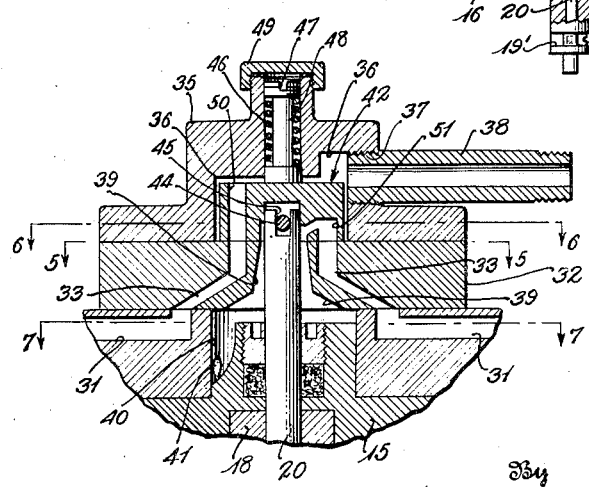
Inventor
Donald G. Griswold
By Bacon & Thomas
Attorneys

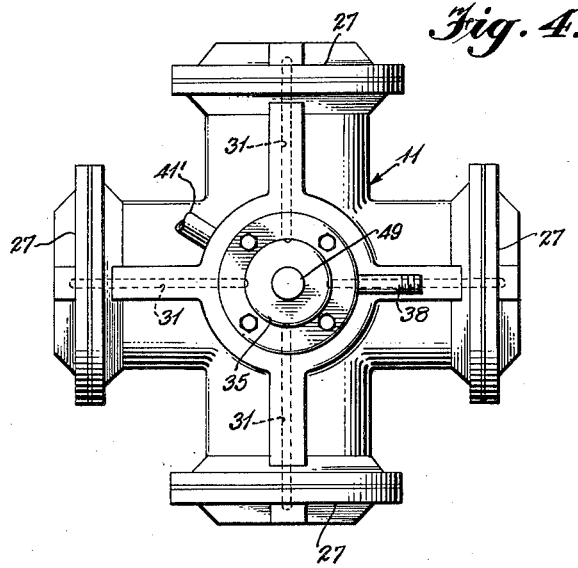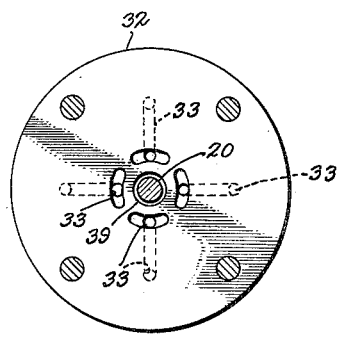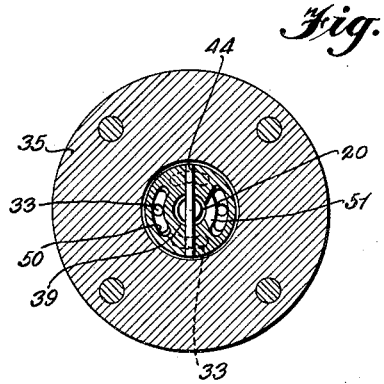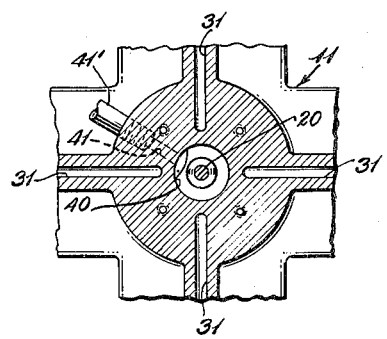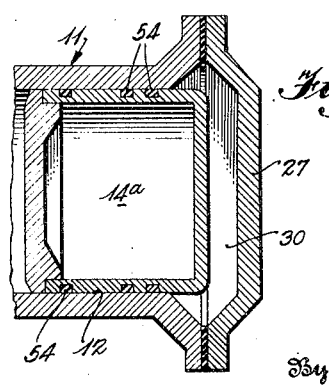

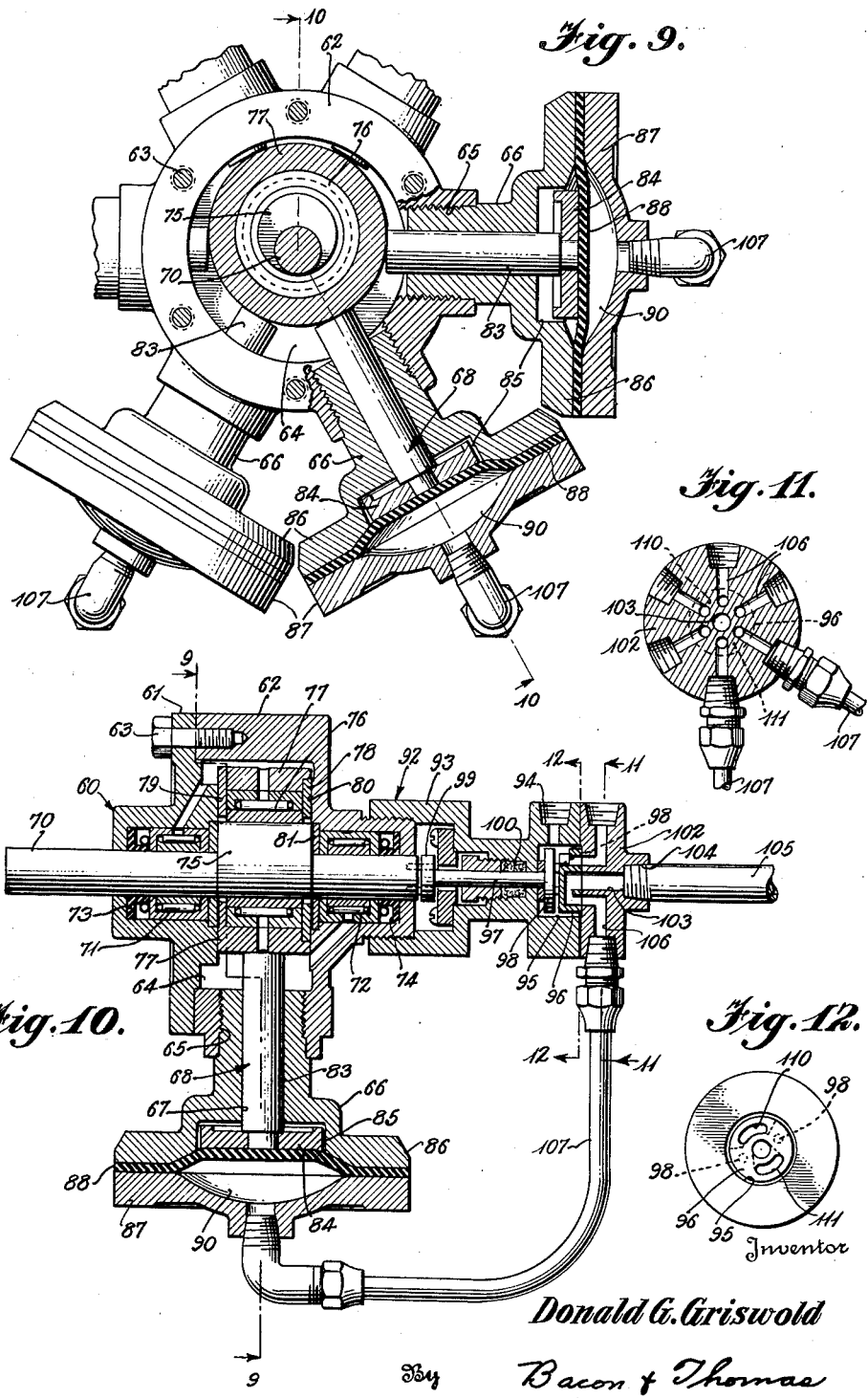

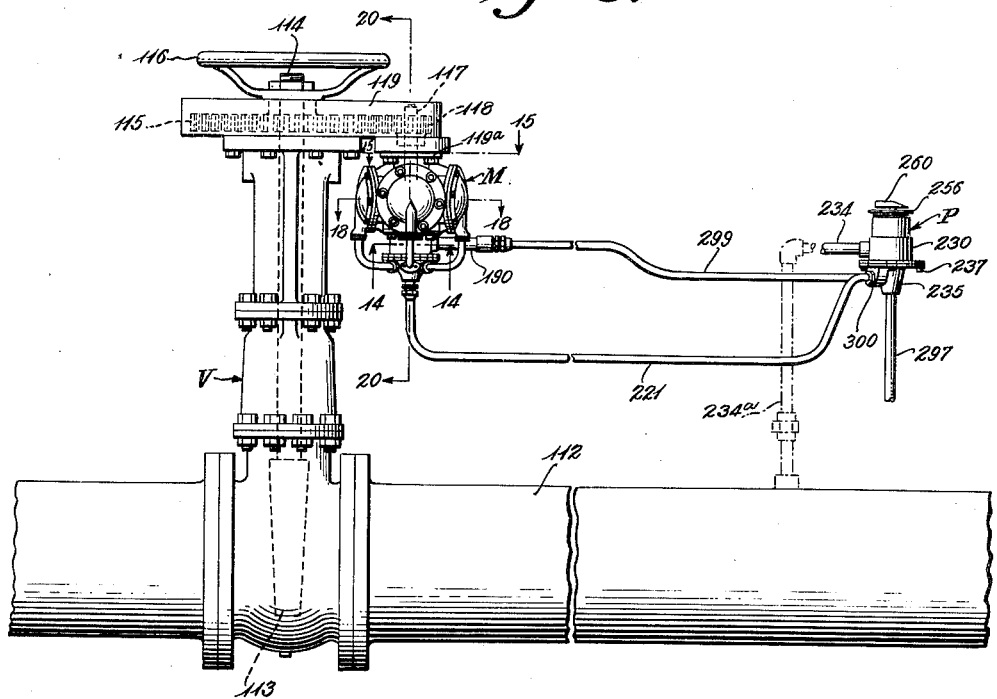

March 20, 1951     D. G. GRISWOLD     2,545,774
ROTARY FLUID MOTOR AND VALVE MEANS
FOR CONTROLLING THE SAME Filed Feb. 25, 1946     11 Sheets-Sheet 5

Inventor
Donald G. Griswold
By Bacon + Thomas
Attorneys

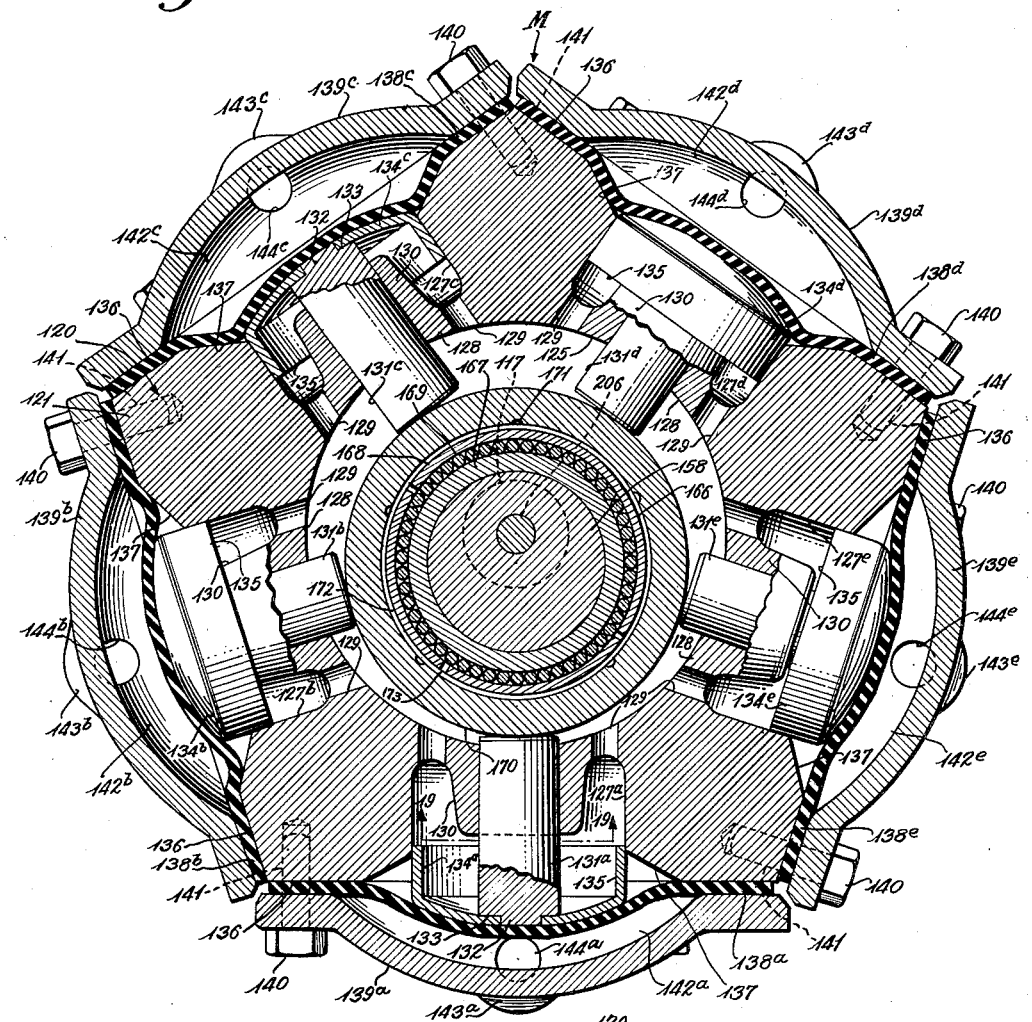

Inventor
Donald G. Griswold
By Bacon + Thomas
Attorneys

March 20, 1951

D. G. GRISWOLD 2,545,774

ROTARY FLUID MOTOR AND VALVE MEANS FOR CONTROLLING THE SAME

Filed Feb. 25, 1946

Inventor
Donald G. Griswold
By Bacon + Thomas
Attorneys

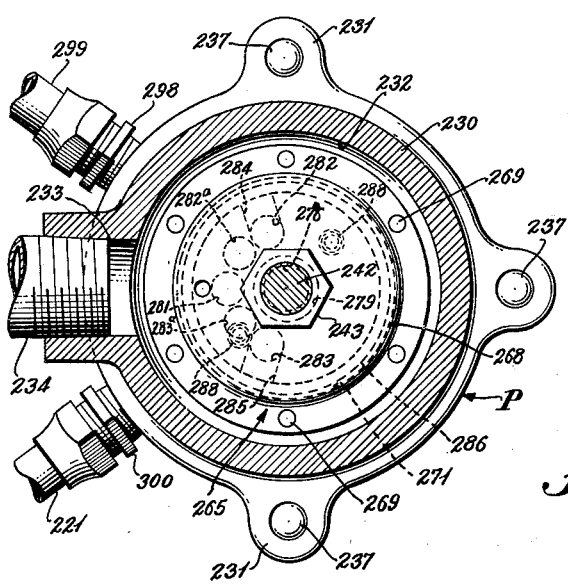
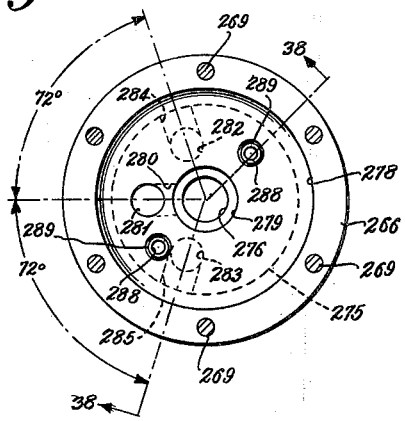
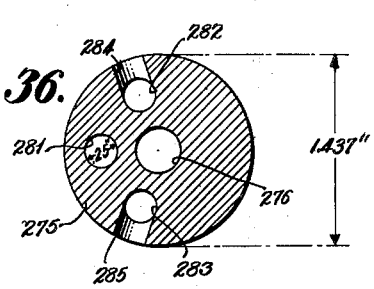
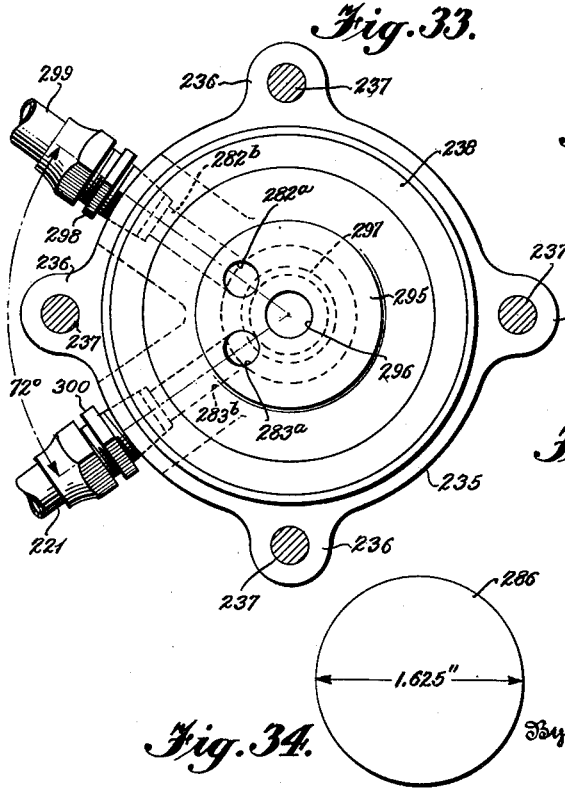
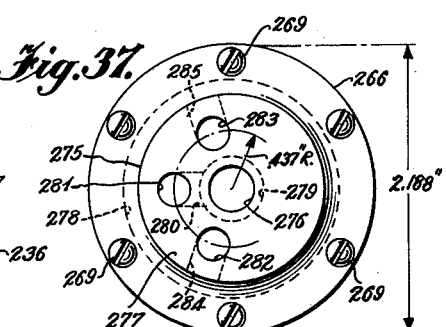
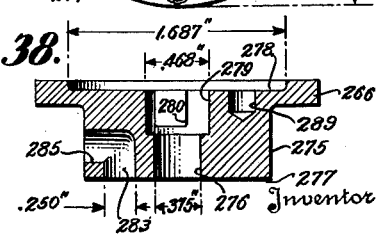

Patented Mar. 20, 1951

2,545,774

UNITED STATES PATENT OFFICE 2,545,774

ROTARY FLUID MOTOR AND VALVE MEANS FOR CONTROLLING THE SAME

Donald G. Griswold, San Marino, Calif.

Application February 25, 1946, Serial No. 649,854

40 Claims. (Cl. 121—121)

This invention relates generally to fluid motors and particularly to fluid motors of the positive displacement type.

The present application is a continuation-in-part of my copending application S. N. 413,810, filed Oct. 6, 1941, which I have allowed to become abandoned in favor of the instant application.

It is a primary object of this invention to provide a simple fluid motor of relatively few parts which is operable by either gas or liquid and which will produce a relatively high torque. There are many instances where it is desirable to have a prime mover capable of delivering a given torque in one direction which can be used to effectively resist force producing torque in an opposite direction. Examples of this are the prime movers for operating large valves, wing flap brakes of airplanes and for hoisting equipment. It therefore is also an object of the invention to provide a fluid motor which can be so used and is capable of resisting a degree of torque tending to reverse it far in excess of the degree of positive torque produceable by the motor. In other words, it is an object to provide a fluid motor which can be used to positively hold an element actuated thereby in a given position, or used as a variable brake or as a positive non-reversible brake.

It is also an object to provide a positive displacement motor which will give a definite number of revolutions per unit of liquid supplied to it and may therefore be used as a fluid motor. In this connection it is an object to provide a motor having no fluid slippage at any speed and one which can be extremely efficiently operated at greatly variable speeds.

It is a further object of the invention to provide a motor which can be readily reversed by an easily operable mechanical adjustment means, or by reversal of the direction of fluid flow through the normal fluid inlet and outlet passages. In relation with this it is an object to provide a motor which will reverse with the reversal of the direction of the fluid therethrough or which can be adjusted to operate in any given direction regardless of the direction of fluid flow supplied to it through the normal inlet and outlet.

It is also an object to provide a motor which will take all of the power available from a fluid under pressure or a portion of it and will deliver a relatively smooth stream at its exhaust after having utilized the pressure of the fluid. In this connection it is an object to provide a motor having a relatively quiet or silent exhaust.

It is a further object of the invention to provide a fluid motor in which one or more power impulses are delivered to the shaft during all degrees of rotation thereof and consequently a motor having no dead center.

Another object of the invention is to provide a fluid motor especially useful for effective positive opening and closing of large valves, etc., and which motor can be controlled from a remote point by a pilot valve and actuated pneumatically by air or any gas under pressure, or hydraulically by fresh water, salt water, oil or any other liquid to positively hold the valve either fully opened or fully closed, or in any desired intermediate position without "creeping" of the flow control member of the valve.

A further object of the invention is to provide a fluid motor which will stop instantly upon shutting off of the supply of operating fluid without any "coasting" due to inertia of the moving parts of the motor, and which will not "creep" after it has been stopped.

Another object of the invention is to provide a fluid motor which will develop full torque under stall loads and extremely high torque at low speeds, the latter feature eliminating the necessity for high gear ratio reduction units between the motor and any device or mechanism operated thereby.

A further object of the invention is to provide a fluid motor capable of exerting a greater driving torque in one direction than in the opposite direction.

A still further object of the invention is to provide a rotary plate or disk type valve adapted for various and general uses, and particularly adapted for use with a fluid motor and which valve will:

(1) Always be maintained seated by fluid pressure irrespective of the direction of the flow of fluid therethrough;

(2) Automatically compensate for any wear that may occur between the rotary disk and its seat; and (3) Always be so "balanced" that very little force is required to rotate the same even under operating pressures in excess of 300 pounds per square inch.

These and other objects of the invention will be apparent from the drawings and the following description thereof. Referring to the drawings which are for illustrative purposes only:

Fig. 1 is a central section through a simple form of motor embodying the invention;

Fig. 2 is a cross section on line 2—2 of Fig. 1;

Fig. 3 is an enlarged fragmentary sectional view in the same plane as Fig. 2 of the valve mechanism and fluid passages at the valve end of the motor;

Fig. 4 is a plan view taken on line 4—4 of Fig. 2 showing certain of the fluid passages in broken lines;

Fig. 5 is an enlarged plan view of the valve base plate taken on line 5—5 of Fig. 3;

Fig. 6 is a sectional plan view on line 6—6 of Fig. 3;

Fig. 7 is a fragmentary sectional plan view on line 7—7 of Fig. 3;

Fig. 8 is a fragmentary sectional view through a cylinder showing a modified form of the invention;

Fig. 9 is a fragmentary plan view broken away to show parts in section of a motor embodying another form of the invention;

Fig. 10 is a cross section of the motor of Fig. 9 taken on line 10—10 of that figure;

Fig. 11 is a cross section through the distributor plate on line 11—11 of Fig. 10;

Fig. 12 is an end view of the valve on line 12—12 of Fig. 10;

Fig. 13 illustrates a third form of fluid motor shown in operative relation with respect to a large gate valve actuated thereby, together with a pilot valve for controlling the fluid motor;

Fig. 14 is an enlarged sectional view through the body of the valve of the motor taken on the line 14—14 of Fig. 13;

Fig. 18 is an enlarged horizontal sectional view through the motor taken on the line 18—18 of Fig. 13;

Fig. 19 is a detail sectional view through one of the motor cylinders taken on the line 19—19 of Fig. 18;

Fig. 32 is a sectional view through the body of the pilot valve taken on the line 32—32 of Fig. 30;

Fig. 33 is a sectional view taken on the line 33—33 of Fig. 30 and particularly illustrating the porting of the fluid distributing base of the pilot valve;

Fig. 34 is a plan view of one of the disks associated with the diaphragm in Fig. 30;

Fig. 35 is a plan view of the ported pilot disk as viewed on the line 35—35 of Fig. 30;

Fig. 36 is a horizontal sectional view through the pilot disk taken on the line 36—36 of Fig. 30;

Fig. 37 is an inverted view of the pilot disk as viewed on the line 37—37 of Fig. 30; and Fig. 38 is a vertical sectional view through the pilot disk taken on the line 38—38 of Fig. 35.

Figure 15:
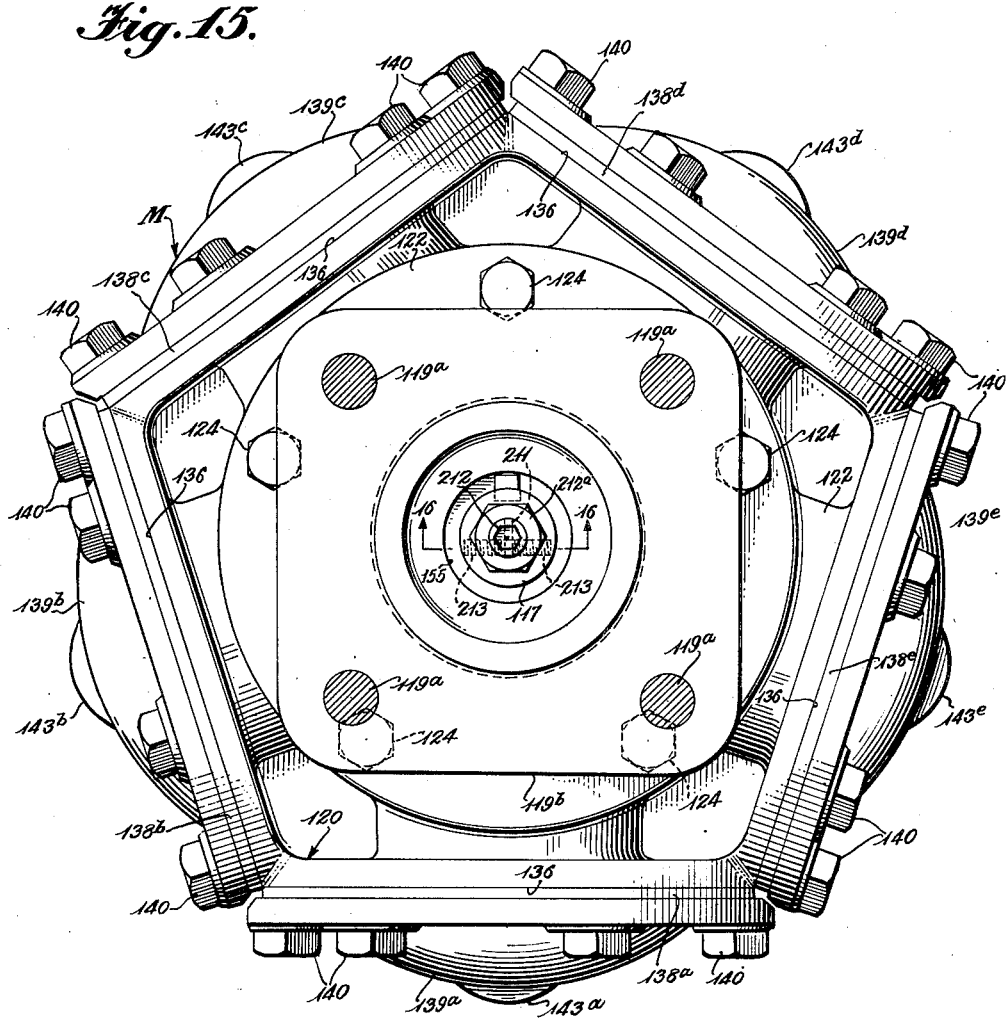
Fig. 15 is an enlarged plan view of the fluid motor as viewed on the line 15—15 of Fig. 13.

More particularly describing the invention, referring to Figs. 1-7, reference numeral 11 generally indicates a housing which in the form shown is provided with four radially extending bores or cylinders 12. It is contemplated that any practical number of such cylinders or bores may be provided and the provision of four in the drawing is merely illustrative of a simple form of the invention. In each of the cylinders is a piston or plunger member 14 which is slidable axially therein. Rotatably mounted centrally of the housing 11 in suitable end members 15 and 16 is a shaft 18. In this form of the invention the parts 15—16 act as bearings for the shaft 18, however, various types of bearings might be utilized for supporting said shaft. The shaft 18 comprises a main shaft section 19 having a central longitudinal bore to accommodate a valve rod 20, the purpose of which will subsequently be described. The main shaft section 19 has an eccentric 21 located in the plane of the cylinders 12. The eccentric 21 is preferably provided with an anti-friction bearing 22 and a thrust ring 23. An annular retainer plate 24 is located at one side of the bearing 22 and ring 23. The pistons or plunger members 14 are adapted to bear directly against the ring 23 and through the medium of the eccentric 21 transfer force impulses to the shaft 18 for rotating the same.

Each of the cylinder 12 is provided with a cap or head closure member 27 removably secured to the housing 11 in any suitable manner as for instance by means of bolts, not shown. A flexible diaphragm 28 is mounted across the end of each cylinder 12 between the cap 27 and the housing 11. The diaphragms 28 are adapted to respectively engage the outer ends of the pistons 14 as shown in the drawing. These diaphragms cooperate with the cap members 27 to provide pressure chambers 30 at the outer ends of the cylinders 12 which are isolated from communication with the bore of said cylinders.

In order to operate the pistons or members 14, pressure fluid is successively admitted to and exhausted from the respective pressure chambers 30 in timed relation. To accomplish this, the housing 11 is provided with the fluid passages 31 (see Figs. 2 and 4) which extend from the respective pressure chambers 30 through a portion of the caps 27 and radially inward to the central portion of the housing 11 at one end thereof. At the inner ends of the passages 31 is a valve base plate or distributor plate 32 (see Figs. 3 and 5) which is provided with fluid passages 33 adapted to register with the aforementioned passages 31.

Mounted on the plate 32 in any suitable manner is a valve body or housing member 35 having a valve chamber 36. Communicating with the valve chamber 36 is a threaded port 37 adapted to receive a fluid inlet pipe 38 which may be connected to a source of liquid or gas under pressure.

The valve plate 32 is provided with a central opening 39 in direct communication with an exhaust chamber 40 in the housing 11. An exhaust passageway 41 leads from the chamber 40 to the exterior of the motor terminating in an exhaust pipe 41', shown in Fig. 3. A packing gland is provided for sealing the valve rod 20 in the region of the exhaust chamber 40.

In order to control the flow of fluid to and from the pressure chambers 30, a rotary disk valve 42 is provided in the valve chamber 36. This valve rotates with the valve rod 20, being mounted thereon by means of a pin 44 extending transversely of the valve rod 20 in a slot 45 in the end thereof. The valve rod 20 itself is turned by the shaft 18 through the cooperation of the interengaging screw 20' on the rod 20 and recess 19' of the shaft. The valve 42 seats on the valve base plate 32 and is yieldably pressed thereagainst by means of the spring 46 and the pressure differential of the fluid on the inlet and exhaust sides of the valve. An adjustment screw 47 limits movement of the valve away from its seat, being positioned to be engaged by a stud 48 on the valve. A cap 49 closes the valve housing 35.

The valve 42 is provided with an inlet passage 50 extending through the valve and adapted to establish communication between the valve chamber 36 and the respective passages 31 leading to the pressure chambers 30 dependent upon the relative position of the valve to the respective passages 33 in the base plate 32. The valve 42 also has an exhaust port 51 adapted to establish communication between the respective passages 31 and 33 and the exhaust chamber 40 with its outlet or exhaust passage 41, dependent upon the position of the valve 42.

As shown in Figs. 5 and 6, the ports 50 and 51 of the valve 42 and the passages 33 in the base plate 32 are arcuate in shape in the region where they are adapted to register. Preferably, the relation of these ports is such that pressure fluid will be supplied to each of the pressure chambers 30 successively during substantially, but not quite, 180° of rotation of the shaft.

In the operation of the motor, any desirable fluid under pressure is introduced to the valve housing chamber 36. The fluid passes through the inlet port 50 in the disk valve 42 to whichever of the passages 33 in the valve plate 32 are at the moment in communication with the port. In this connection it should be pointed out that since the port 50 and the ends of passages 33 are arcuate in shape the port 50 covers more than one of the passages 33 at a time during certain portions of its rotation. As hereinbefore pointed out, the passages 33 directly communicate with the passages 31 leading to the pressure chambers 30. In the position in which the parts are shown in the drawing, pressure fluid is being supplied to the pressure chamber 30 at the left hand side of Figs. 1 and 2. This pressure fluid moves the diaphragm 28 and the piston or plunger 12 associated with said chamber inwardly against the eccentric mechanism 23, etc., to rotate the shaft 18. At the same time, the exhaust port 51 establishes communication between the passage 39 and passages 33 and 31 communicating with the pressure chamber 30 at the right hand side of the drawing in Figs. 1 and 2 thereby permitting the fluid in that chamber to escape through the exhaust chamber 40 and exhaust passage 41 and pipe 41'.

It will be obvious that upon further inward movement of the piston 14 at the left of the drawing, the rotation of the shaft 18 will turn the valve 42 sufficiently to cause the inlet port 50 to come into communication with the port 33 leading to the pressure chamber 30 at the top of the drawing in Fig. 1 and cause the outlet port 51 to come into communication with the passage 33 leading to the chamber 30 at the bottom of Fig. 1. In the position in which the parts are shown in Fig. 1, the upper piston 14 has just completed or reached the end of its exhaust stroke while the lower piston 14 has just completed the end of its pressure stroke. Further rotation of the shaft 18 through the action of the pressure fluid against the diaphragms 28 and their associated pistons 14 will serve to rotate the valve 42 to successively communicate each of the pressure chambers 30 with the pressure port 50 and with the exhaust passage 51 to operate the motor. It is desirable to have pressure fluid supplied to the individual chambers 30 during approximately, but not quite, 180° of rotation of the shaft 18 and the ports 50 and 51 of the valve 42 and the outlet ends of the passages 33 are accordingly made arcuate and of sufficient length to cooperatively accomplish this.

In the operation of the motor as described above, the valve rod 20 rotates with the shaft 18 of the motor by reason of the pin or screw 20' on the shaft 18 engaging the wall of the recess 19' in the shaft 18. The motor may be reversed by turning the valve rod 20 180° bringing the screw 20' to the opposite side of the recess 19' in the shaft 18. The 180° turn of the rod 20 brings the ports 50 and 51 of the disk valve 42 in a position to connect the pressure chambers 30 which have been connected to pressure fluid with the exhaust and to connect the chambers 30 which have been open to exhaust to the pressure fluid, thereby effectively reversing the motor.

It is contemplated that the diaphragms 28 may be made of material suited to the particular type of fluid used for operating the motor so they will not be attacked and injured by it. In some instances it may be desirable to operate the motor with a fluid such as steam which is particularly destructive of various commonly used diaphragm materials. To provide for this contingency, in Fig. 8 there is shown a fragmentary view of one end of a cylinder 12 in which the diaphragm has been omitted and the piston, indicated by 14a, is provided with a sealing means such as the piston rings 54. A motor embodying this construction will have some disadvantage over the previously described form of the invention in that there may be some fluid slippage or escape past the piston 14a and that the friction of the seal means 54 interposed between cylinder 12 and piston 14a will have to be overcome by the pressure fluid.

Referring to Figs. 9 to 12, inclusive, there is shown a more advanced design of motor embodying the invention. In these figures, reference numeral 60 generally indicates the housing which is provided with the parts 61 and 62 secured together by means of bolts 63. This housing provides a central chamber 64 from which extend radially disposed openings 65. These openings are screw threaded and adapted to accommodate housing extension members 66. The members 66 have bores 67 to slidably receive plunger members 68, which will be more fully described hereinafter.

A shaft 70 is rotatably mounted in the housing 60 by means of roller bearings 71 and 72, fluid seals 73 and 74 being provided at the outer ends of these bearings. The shaft 70 has an eccentric portion 75 which supports an anti-friction bearing 76. A thrust ring 77 is mounted around the bearing and is associated with an annular end plate 78. The interior of the housing 60 is so shaped that it provides bearing or guide faces 79 and 80 for the ring 77 and plate 78. A plate 81 is provided at each side of the eccentric portion 75 of the shaft 70.

The plunger members 68 bear directly against the thrust ring 77 and consist of the shanks 83 and the heads 84. The head 84 of each plunger member 68 is received in a recess 85 formed within an enlarged portion 86 of the individual extension members 66. A cap 87 is provided at the end of each of the members 66 and may be detachably mounted thereon in any suitable manner. Interposed between the caps 87 and the extension members 66 are flexible diaphragms 88 which cooperate with the cap members 87 to form pressure chambers 90. The diaphragms 88 are adapted to engage the head members 84 on the plungers 68 in the same manner that the diaphragms engage the pistons in the form of the invention previously described.

In this second form of the invention, means are provided for successively admitting pressure fluid to the pressure chambers 90 and for exhausting it therefrom in timed relation to the rotation of the shaft 70. Generally, this means comprises a fluid distributing system including a rotary disk valve operable by the shaft 70. Thus, a valve housing member 92 is provided which has a hollow, internally threaded portion 93 adapted for mounting on the housing part 62, as shown in Fig. 10. This valve housing member 92 has a fluid inlet 94 which is shown as screw threaded for the accommodation of a supply conduit (not shown) for supplying pressure fluid. The inlet 94 communicates with a valve chamber 95 housing a rotary disk valve 96 of the same general type heretofore described. This valve is driven by a valve shaft 97 through the pins 98 extending from a drive disk 98'. The shaft 97 is connected to and driven by the main shaft 70 of the motor through the coupling 99. A stuffing box 100 is included intermediate the ends of the valve housing 92 to seal the shaft 97 at that point.

A valve base plate or distributor plate 102 is mounted on the valve housing 92 by any suitable means. This plate 102 contains a central exhaust passage 103 which terminates in a screw threaded outlet 104 adapted to accommodate exhaust pipe 105. The plate 102 is provided with a plurality of fluid distribution passages 106 equalling in number the pressure chambers 90. Suitable conduits 107 are provided to connect each of these passages 106 with the pressure chambers 90, the ends of the conduits 107 being respectively connected with the plate 102 and a cap member 87.

The valve 96 is provided with an inlet port 110 and an exhaust port 111. These ports are arcuate in shape in the region where they overlie the inner ends of the fluid distribution passages 106 (see Figs. 11 and 12) in the distributor plate 102 thereby enabling the ports to cover more than one of the fluid passages 106 at a time. The exhaust port 111 extends radially inward to establish communication with the exhaust passage 103 in the fluid distributor plate 102. With this construction, the valve disk 96 when rotated by the shaft 70 is effective to establish communication between the pressure fluid and each of the pressure chambers 90 successively so that each chamber is subjected to pressure fluid during a few degrees less than 180° of rotation of the shaft. Likewise, the exhaust port 111 is effective for establishing communication between the pressure chambers 90 and the exhaust outlet 103 of the motor during an equal number of degrees of rotation of the shaft 70 when the particular chambers are not subjected to pressure fluid.

It will be apparent that the motor shown in Figs. 9 to 12 operates on the same principle and in the same general manner as the motor of Figs. 1 to 7, that is, pressure fluid is successively applied to the diaphragms 88 in timed relation with the rotation of the shaft 70 to operate the plunger members 68 and cause rotation of the shaft 70, the valve mechanism 97—98'—96 being operable by the shaft 70. The motor shown in Figs. 9 to 12, however, develops more power and is smoother in operation, having six cylinders 66 and consequently a greater number of power impulses for each rotation of the shaft 70.

It is a feature of the invention that the motor may be used in installations where it is desirable to have the motor act as a brake or as a positive means for preventing reversal of the driven members. In connection with the non-reversal feature, where it is desired to hold the shaft of the motor against reversal by a force greater than the effective power output or torque developed by the motor with the particular fluid supplied to it, the motor can be locked against reversal by preventing any reverse flow of the liquid in the inlet conduit. This can easily be accomplished by placing a check valve (not shown) in the pressure fluid supply line, for example.

It may also be pointed out that in some installations it may be desirable to lock the valve rod 20 integral with the shaft 19 in the form of the invention shown in Figs. 1 to 7 to prevent accidental reversing of the motor, as might possibly take place where a force greater than the torque of the motor reversed the shaft of the motor independently of the valve rod 20 thereby reversing the motor. With the construction shown in Fig. 2, the valve rod 20 is adjustable through 180° with relation to the shaft and is normally rotated by the screw 20' engaging the wall of the recess 19' in the shaft, there being no means shown for preventing the reversal of the shaft independently of the valve rod through 180°. Since the force required for rotating the valve rod is relatively small, various types of means could be used for adjustably holding the valve rod in a given position with relation to the shaft.

Figs. 13 to 18, inclusive, illustrate a third and preferred design of reversible fluid motor employing the principles of this invention. In these figures, the letter M generally identifies the motor, and in Fig. 13 the motor M is shown associated with a conventional gate valve V and a pilot valve P. The valve V is shown connected in a pipe line 112 and includes a vertically slidable gate 113 carried by a stem 114 having a gear 115 arranged to effect raising and lowering of the gate 113 in a conventional and well understood manner. A hand wheel 116 is also associated with the stem 114 to effect manual operation of the gate 113, when desired. The movement of the gate 113 is normally controlled by the motor M, which in turn is under the control of the pilot valve P, as will be set forth in greater detail later. However, it is here pointed out that the motor M includes a shaft 117 carrying a pinion 118 that meshes with the gear 115 to effect driving of said gear in opposite directions to raise and lower the gate 113, or to maintain said gate in any desired intermediate position of adjustment. The motor M is mounted upon a gear casing 119 by means of four bolts 119a.

Figure 20:
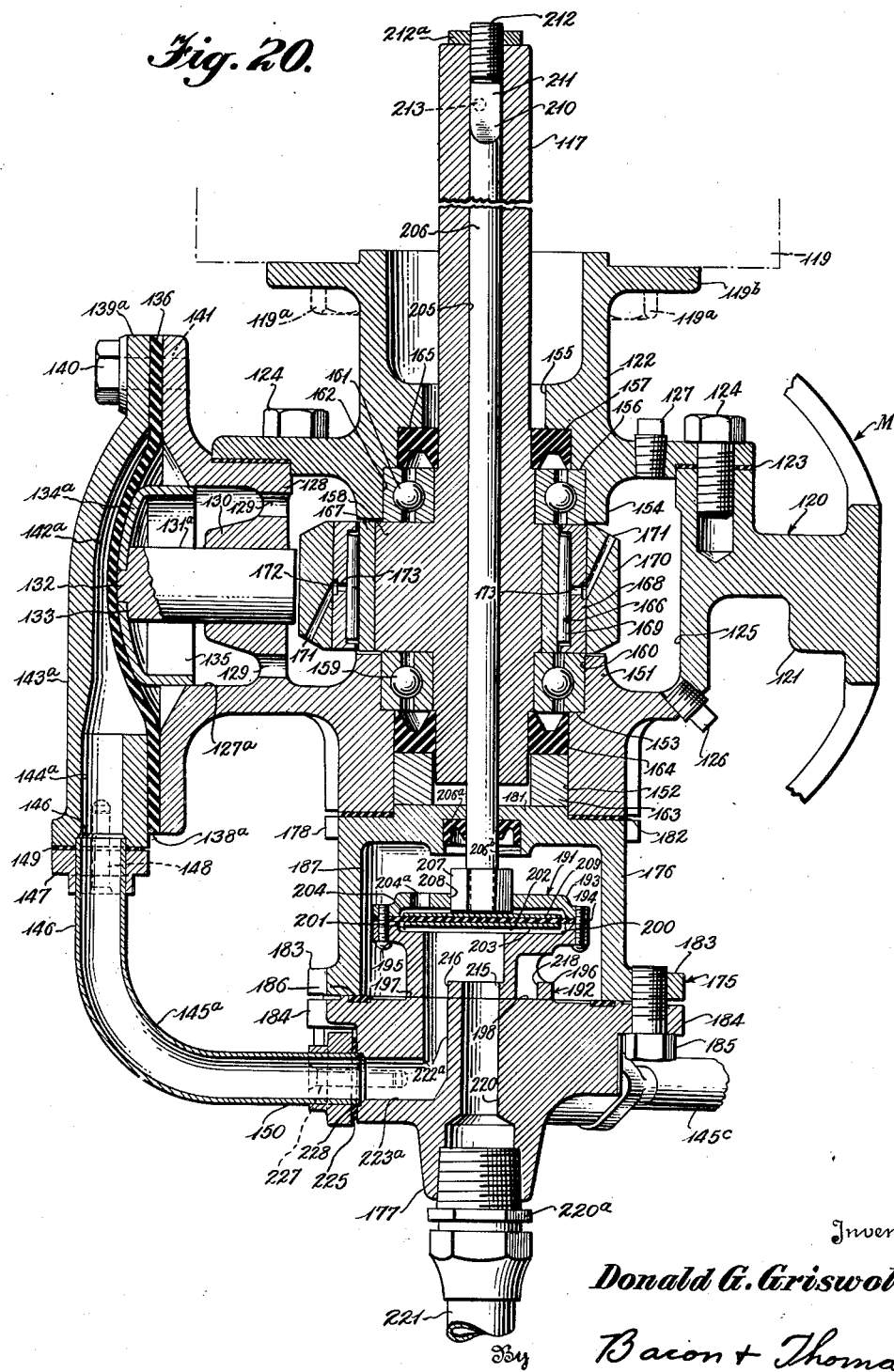
Fig. 20 is an enlarged vertical sectional view through the motor taken on the line 20—20 of Fig. 13.

Referring now more particularly to Figs. 18 to 20, the motor M includes a housing generally identified by the numeral 120 and including sections 121 and 122 having a gasket 123 interposed therebetween and secured together by a plurality of bolts 124. The housing section 122 has a flange 119b through which the bolts 119a, previously referred to, extend to secure the motor to the gear casing 119. The housing section 121 is hollow and provides a central circular chamber 125, which serves as a reservoir for a lubricant. A plug 126 in the housing section 121 and a plug 127 in the housing section 122 provide access to the chamber 125.

The housing section 121 is preferably provided with an odd number of radial cylinder bores equi-angularly spaced about the axis of said housing section and extending outwardly from the chamber 125. In the present instance, the housing section 121 is provided with five cylinder bores 127a, 127b, 127c, 127d, and 127e, but it is to be understood that the number of cylinder bores may be increased or decreased depending upon the load capacity desired. Each of the bores 127a to 127e has a transverse wall 128 extending across the inner end thereof provided with a series of passageways 129, which establish communication between the chamber 125 and the respective cylinder bores. Each of the walls 128 carries a radially projecting boss 130 and these bosses slidably receive and guide plunger rods 131a, 131b, 131c, 131d and 131e. Each of the plunger rods 131a to 131e has a reduced outer end portion 132 providing a shoulder 133. Generally cup-shaped pistons 134a, 134b, 134c, 134d and 134e are each centrally apertured to receive the reduced portion 132 and to seat against the shoulder 133. The reduced portion 132 is preferably peened over to permanently secure the pistons 134a to 134e to their respective plungers 131a to 131e. Each of the pistons 134a to 134e includes a skirt portion 135 that has a sliding fit with the inner surface of its associated cylinder bore.

The housing section 121, since it has five cylinder bores 127a to 127e is made pentagonal in transverse cross section as best illustrated in Fig. 18. Thus, the housing section 121 has five sides 136 with the cylinder bores 127a to 127e having the outer ends thereof disposed medially of said sides. Each of the sides 136 is countersunk to provide an inclined annular surface 137 adjacent the outer end of each of the cylinder bores 127a to 127e. Circular diaphragms 138a, 138b, 138c, 138d and 138e extend across the open end of the cylinder bores 127a to 127e, respectively, the inner side of said diaphragms being adapted to contact the head of the pistons 134a to 134e. Circular cap members 139a, 139b, 139c, 139d and 139e overlie the diaphragms 138a to 138e and engage the marginal portions thereof. A plurality of bolts 140 extend through the cap members and diaphragms and are threaded into suitable openings 141 formed in the housing section 121 to maintain the parts assembled in leak proof relation.

Each of the cap members 139a to 139e is dished to provide pressure chambers 142a to 142e at the outer side of said diaphragms. The cap members 139a to 139e are provided with enlargements 143a to 143e having passageways 144a to 144e communicating with the pressure chambers 142a to 142e, respectively. Tubes 145a to 145e have one end 146 thereof projecting slightly into the passageways 144a to 144e, and said end of each of these tubes is preferably soldered or brazed to a fastening member 147, the fastening members in turn being secured to the enlargements 143a to 143e by countersunk screws 148, a gasket 149 surrounding the ends 146 of the tubes 145a to 145e being interposed between the confronting faces of the fastening members 147 and the enlargements 143a to 143e to form a leak proof seal. The opposite ends 150 of the tubes 145a to 145e are connected with the base of a motor valve which controls the distribution of fluid to the pressure chambers 142a to 142e, as will be pointed out in detail hereinafter.

The housing section 121 has a boss 151 (Fig. 20) projecting inwardly into the chamber 125 and a stepped bore 152 arranged axially of said boss and providing a shoulder 153. The housing section 122 has a similar inwardly projecting boss 154 and a stepped axial bore 155 providing shoulders 156 and 157. The motor shaft 117, previously referred to, extends through the bore 155 and into the bore 152 and has an intermediate eccentric portion 158 disposed between the bosses 151 and 154. A ball bearing 159 is disposed on the shaft 117 below the eccentric portion 158 and is received in an enlarged portion 160 of the bore 152 and is supported by the shoulder 153. A second ball bearing 161 is mounted on the shaft 117 at the upper side of the eccentric 158 and is received in an enlarged portion 162 of the bore 155 and is engaged by the shoulder 156.

An annular spacer ring 163 is disposed at the lower end of the bore 152 and a suitable rubber shaft sealing member 164 is disposed between said spacer and the ball bearing 159 to prevent leakage of lubricant from the chamber 125 downwardly along the shaft 117. A similar shaft seal 165 is disposed in the bore 155 between the shoulder 157 and the ball bearing 161 to prevent leakage of lubricant upwardly along the shaft 117. It will be apparent from the foregoing, that the ball bearings 159 and 161 provide an anti-friction mounting for the shaft 117 and are so arranged as to absorb all longitudinal thrust of the shaft 117 relative to the housing 120.

A roller bearing 166 surrounds the eccentric portion 158 of the shaft 117 and is received between the confronting faces of the bosses 151 and 154, as best shown in Fig. 20. The roller bearing 166 includes an inner plane cylindrical race member 167 and an outer channel shaped race member 168, with rollers 169 disposed between said race members. A cylindrical thrust ring 170 surrounds the outer face 168 and its outer periphery contacts with the inner end faces of the plungers 131a to 131e. The thrust ring 170 is provided with oil passageways 171 which communicate with an annular oil groove 172 and radial oil passageways 173 in the outer race 168 to supply lubricant to the space between the races 167 and 168 occupied by the rollers 169. The openings 129 in the transverse wall 128 at the inner ends of the cylinder bores 127a to 127e, obviously permit lubricant to enter said bores for lubricating the pistons 134$^a$ to 134$^e$.

Figure 21:
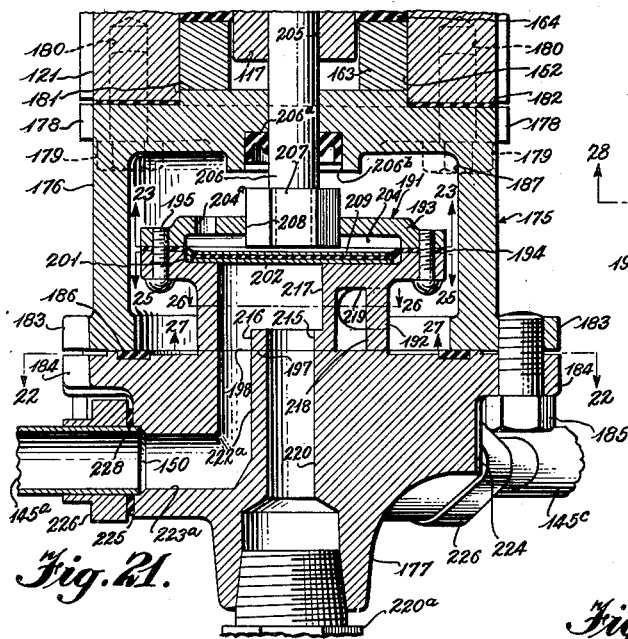
Fig. 21 is a sectional view of the motor valve shown in Fig. 20, but illustrating the effect of a reversal of the direction of flow of operating fluid on the position of the diaphragm and disks shown in Fig. 20.
Figure 25:
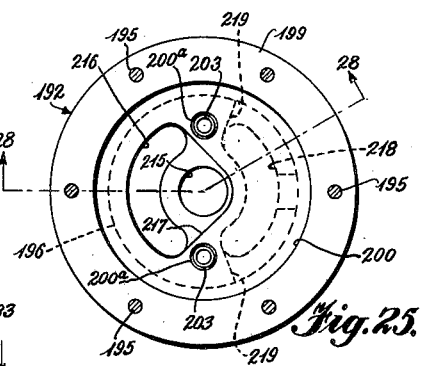
Fig. 25 is a plan view of the body of the motor valve disk taken on the line 25—25 of Fig. 21.

A motor valve for controlling the supply and exhaust of operating fluid to the pressure chambers 142$^a$ to 142$^e$ of the motor M is generally identified by the numeral 175 (Figs. 20 and 21). The motor valve 175 includes a valve body 176 and a fluid distribution base member 177. The valve body 176 is generally cylindrical and is provided at the upper end thereof with four radially projecting lugs 178, best shown in Fig. 14, and bolts 179 extend through said lugs and into threaded openings 180, Fig. 21, in the housing section 121 for detachably mounting the motor valve 175 upon said housing section. The upper face of the valve body 176 is provided with a central boss 181 for aligning the same with the bore 152. A gasket 182 form a seal between the valve body 176 and the housing section 121. The valve body 176 has five radially projecting lugs 183 at its lower end which are aligned with similar lugs 184 projecting radially from the base member 177. Bolts 185 project through the lugs 184 and are threaded into the lugs 183 for securing the base member 177 to the valve body 176, a gasket 186 providing a seal between said base and valve body.

The valve body 176 is hollow and forms a chamber 187, and a boss 188 (Fig. 14) projects angularly from said valve body and is provided with an opening 189 having one end of a pipe 190 threaded therein. A rotary valve 191 is disposed in the chamber 187 and includes a disk member 192, a cover 193 and a flexible diaphragm 194 between said body and cover, screws 195 holding the parts in assembled relation as shown.

The details of construction of the motor valve 175 are best illustrated in Figs. 21 to 28, inclusive. The motor valve disk 192 includes a lower cylindrical portion 196 having a face 197 at the lower end thereof which engages a lapped seat 198 formed on the upper surface of the base member 177. The opposite end of the motor valve disk 192 has a radially projecting flange 199 through which the screws 195 extend for securing the diaphragm 194 and cover 193 to the valve disk 192. It will be observed that the flange 199 is counterbored at 200 to provide a chamber 201 at the lower side of the diaphragm 194 adapted to receive a circular, stiff brass plate 202. The counterbored area 200 is provided with two recesses 200$^a$ for the reception of two light springs 203 which engage the lower side of the plate 202 and normally urge the same into contact with the lower side of the diaphragm 194. The cover member 193 is recessed or centrally counterbored to provide a chamber 204 (similar to the chamber 201) above the diaphragm 194. An opening 204$^a$ extends through the cover 193 to establish free communication between the chamber 204 and the chamber 187.

The motor shaft 117 is provided with an axial bore 205 for the reception of a pin or rod 206. The lower end of the rod 206 has a hexagonal element 207 tightly mounted thereon which is received in a hexagonal opening 208 formed in the rotary valve cover 193 for providing a non-rigid driving connection between the rod 206 and the rotary valve 191. A circular plate 209, similar to the plate 202, is disposed in the chamber 204 between the diaphragm 194 and the adjacent face of the hexagonal member 208. A sealing member 206$^a$ is disposed in a recess 206$^b$ in the valve body 176 and surrounds the rod 206 to prevent the escape of fluid from the chamber 187 into the bore 152 in the housing section 121.

Figure 16:
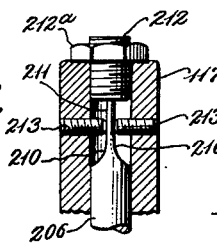
Fig. 16 is a detail sectional view taken through the upper end of the motor shaft on the line 16—16 of Fig. 15.
Figure 17:
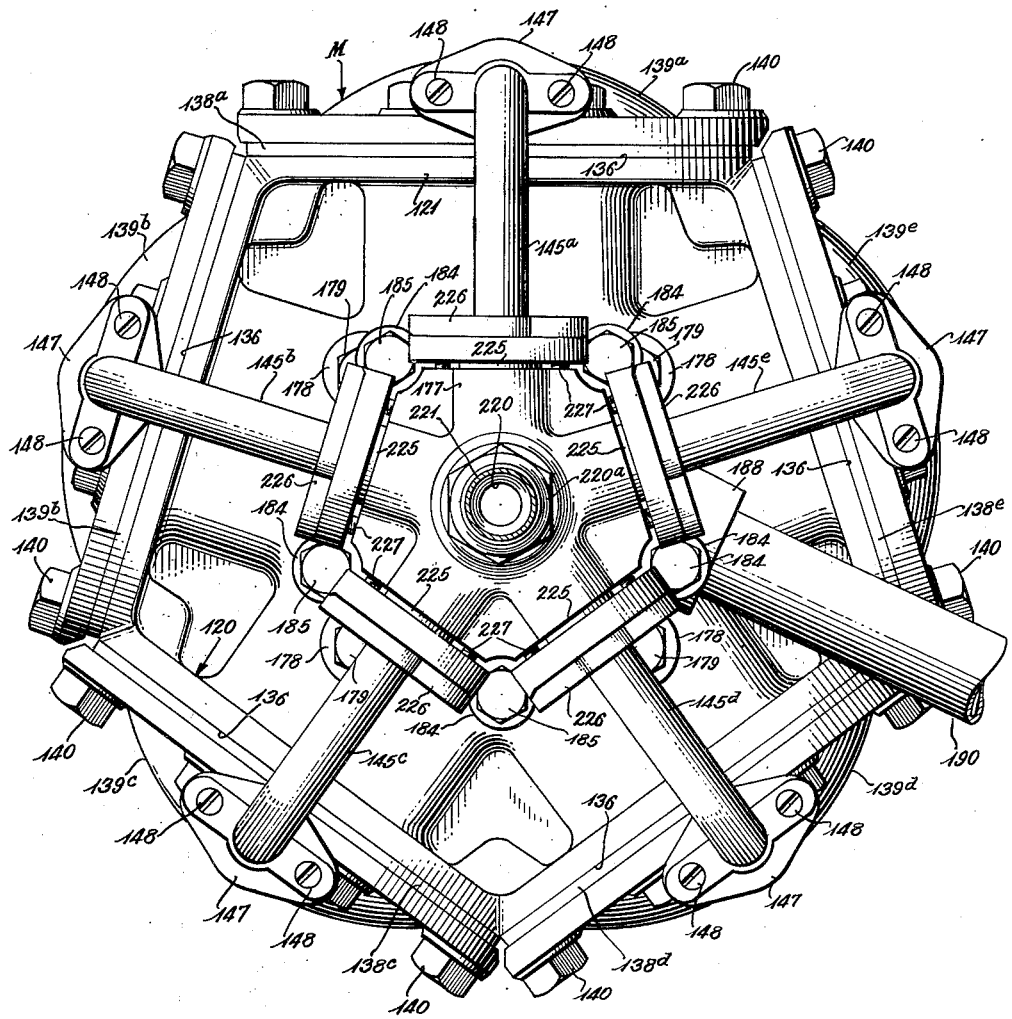
Fig. 17 is an enlarged inverted plan view of the motor shown in Fig. 13.

The upper end of the rod or stem 206 is milled or ground on the opposite sides thereof, as indicated at 210, Fig. 16, to provide a relatively flat, narrow extension 211. The rod 206 is axially adjustable relative to the motor shaft 117 by means of a set screw 212 threaded into the upper end of the bore 205, the inner end of said set screw being engaged with the end face of the narrow rod extension 211. Rotation of the set screw 212 will vary the adjustment of the end face of the hexagonal member 207 with respect to the plate 209 and diaphragm 194, for a purpose to be set forth later. A lock nut 212$^a$ locks the set screw 212 in the desired position of adjustment. Angular or rotary adjustment of the rod 206 with respect to the motor shaft 117 is effected by a pair of set screws 213 mounted in the motor shaft 117 and located in a plane disposed to one side of the axis of said shaft, as best shown in Fig. 15. The inner ends of the set screws 213 engage the opposite sides of the extension 211 and not only serve to prevent relative rotation of the rod or stem 206 with respect to the motor shaft 117, but serve the further purpose of varying the angular position of the rotary valve 191 with respect to the motor shaft 117 and the motor valve base 177, as desired. Such angular adjustment can be effected by backing out one set screw 213 and advancing the other. The object of this adjustment is to reposition the rotary valve 191 relative to its seat 198 so that the motor M can be set to cause the shaft 117 to develop a greater driving torque in one direction than in the other, whereby to provide greater power for, say, unseating the gate 113 of the valve V than is provided for initiating movement of said gate toward seated position upon reversal of the direction of rotation of said motor.

Figure 26:
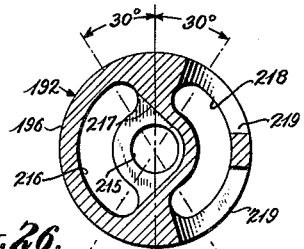
Fig. 26 is a horizontal sectional view through the motor valve disk taken on the line 26—26 of Fig. 21.

The porting of the motor valve disk 192 is best illustrated in Figs. 25-28, inclusive. It will be noted from these figures that a circular port 215 extends axially inwardly from the face 197 and that an elongated arcuate port 216 extends inwardly from the same face, the two ports being merged by a recessed portion or chamber 217 which interconnects the same within the valve disk and extends downwardly from the counterbored portion 200. A second arcuate port 218 also extends inwardly from the face 197 and is formed on the same radius and has the same arcuate length as the port 216. The port 218 communicates with the chamber 187 in the valve body 176 through openings 219 formed in the side wall of the cylindrical portion 196. The adjacent rounded ends of the arcuate ports 216 and 218 are formed upon radii spaced 60° apart, as indicated in Fig. 26.

Figures 22, 24:
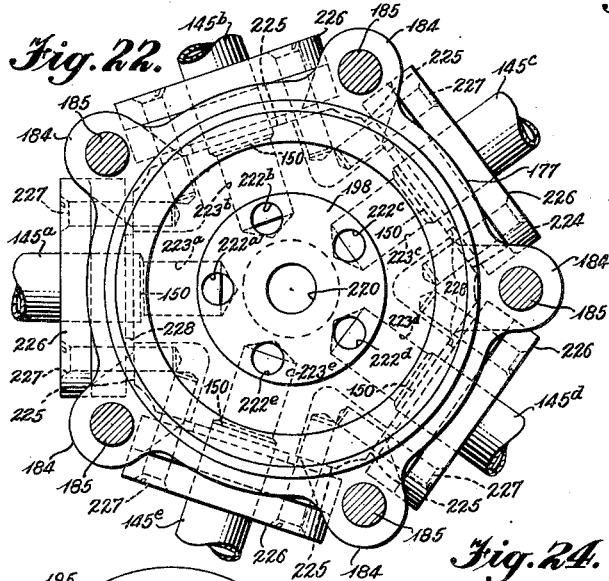
Fig. 22 is a sectional view taken on the line 22—22 of Fig. 21 and particularly illustrating the porting of the base member of the motor valve.
Fig. 24 is a plan view of one of the disks disposed on either side of the motor valve diaphragm shown in Fig. 21.
Figure 27:
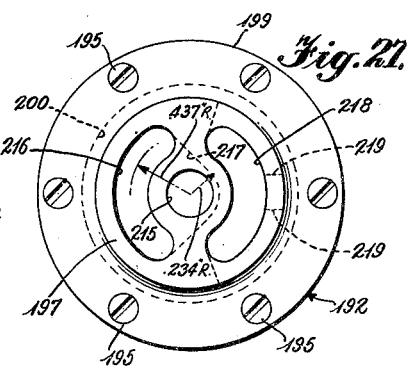
Fig. 27 is an inverted view of the motor valve disk as viewed on the line 27—27 of Fig. 21.
Figure 23:
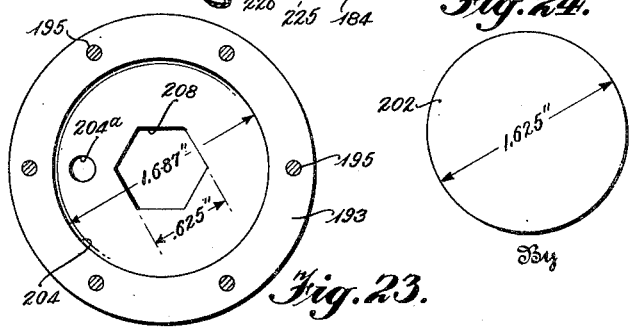
Fig. 23 is a sectional view taken on the line 23—23 of Fig. 21 showing certain details of the cover of the motor valve disk.
Figure 28:
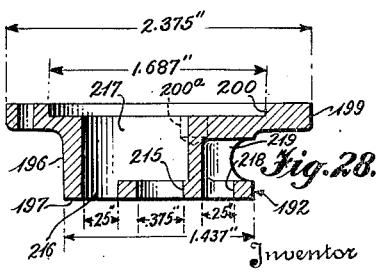
Fig. 28 is a vertical sectional view through the motor valve disk taken on the line 28—28 of Fig. 25.
Figure 29:
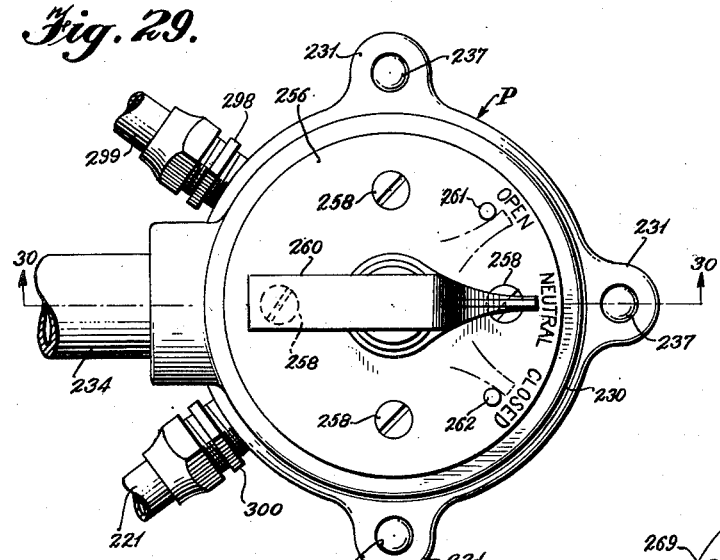
Fig. 29 is an enlarged plan view of the pilot valve shown in Fig. 13.

The porting of the base member 177 is best illustrated in Figs. 21 and 22. It will be noted from these figures that a port 220, of the same diameter as the disk port 215, is arranged in axial alignment with said disk port. The port 220 is enlarged and threaded at its outer end for connection with a conventional fitting 220$^a$ having one end of a conduit 221 connected thereto. The base member 177 is further provided with five ports, 222$^a$, 222$^b$, 222$^c$, 222$^d$, and 222$^e$, arranged parallel with the port 220 and drilled on the same radius as that of the arcuate ports 216 and 218 of the rotary disk 192, thus assuring registration of the ports in said base and disk to effect the desired working cycle of the motor M. The ports 222ᵃ to 222ᵉ communicate with the inner ends of radially extending passageways 223ᵃ to 223ᵉ, respectively, which in turn receive the ends 150 of the tubes 145ᵃ to 145ᵉ, previously referred to. The passageways 223ᵃ to 223ᵉ are formed in a pentagonal portion 224 of the base member 177, thereby providing five sides 225. Fastening members 226 are soldered or otherwise connected to the ends 150 of the tubes 145ᵃ to 145ᵉ and are mounted on the sides 225 by countersunk screws 227, gaskets 228 being interposed between the faces 225 and the adjacent faces of the fastening members 226, thus providing a leakproof connection between the tubes 145ᵃ to 145ᵉ and the base member 177.

The driving of the motor shaft 117 under the control of the rotary valve 191 is effected by the successive registration of the ports 216 and 218 with the ports 222ᵃ to 222ᵉ of the base member 177 for successively admitting operating fluid into the pressure chambers 142ᵃ to 142ᵉ and exhausting operating fluid from said pressure chambers, in the same manner as that accomplished by the rotary valves employed in the two previously described motors. However, the motor M shown in Figs. 13 to 28, inclusive, includes certain features of construction not embodied in the previously described forms of motors. One of these features resides in the provision of means for effecting minute angular adjustment of the rotary valve 191 with respect to the shaft 117, and consequently relative to the base member 177, to vary the timing of the inlet and exhaust of operating fluid to the pressure chambers 142ᵃ to 142ᵉ. Such angular adjustment of the rotary valve 191 can be effected to cause the motor M to develop a greater torque when driving the shaft 117 in one direction than in the opposite direction. This obviously follows from the fact that rotary adjustment of the valve 191 will cause the admission of operating fluid to the pressure chambers 142ᵃ to 142ᵉ to be cut off sooner or later, depending upon the direction of adjustment. Thus, if the valve 191 is adjusted to provide early fluid admission to effect rotation of the shaft 117 in one direction, great driving torque will be developed; whereas, when the motor is reversed, the fluid admission will occur correspondingly late so that a relatively low driving torque will be developed for driving the shaft 117 in the opposite direction. The advantage of such arrangement is that the motor M can be adapted to provide unusually high torque for meeting heavy starting load requirements, as when used for actuating a large gate valve, considerable force then being required to unseat the gate from its tightly closed position especially if it has a tendency to stick; whereas, comparatively little starting load is required to initiate movement of the same gate from open toward closed positions. In Fig. 13, the motor M has been shown mounted upon a gate valve V for controlling the opening and closing movements of the gate 113, as previously pointed out.

A further feature embodied in the motor M resides in the novel construction of the rotary valve 191 itself, said valve being so designed as to be almost "balanced," but providing a very slight excess of pressure in favor of seating the valve so that only a very slight force is required to effect rotation thereof, even when the operating fluid for the motor is under pressures in excess of 300 lbs. per square inch. A further feature of the rotary valve 191 is that the relation of the pressures effective thereon is such that the disk 192 is always urged in a direction toward its seat 198, regardless of the direction in which operating fluid is passing through the motor valve 175.

As has been pointed out in connection with the description of the motors shown in Figs. 1–12, the reversal of the direction of rotation of the motor can be effected by turning the rotary valve through an angle of 180°, and such reversal can also be effected in the motor M shown in Figs. 13 to 28 by removing the set screw 212, retracting the set screws 213 and rotating the rod or stem 206 through an angle of 180°, and thereafter, of course, readjusting the set screws 212 and 213. Such adjustment of the rotary valve 191 does not require a reversal of the direction of the flow of fluid through the motor valve 175. It is preferred, however, to leave the set screws 212 and 213 in their desired position of adjustment and to effect the reversing of the motor M by changing the direction of flow of operating fluid under pressure to the motor valve 175. This change in direction of flow of operating fluid to and from the motor M is effected through the pilot valve P, as will be explained later. However, the fact is stressed at this point that such reversal of flow of operating fluid does not cause the rotary valve 191 to leave its seat. On the contrary, the construction of the rotary valve 191 is such that the pressure of the operating fluid will always be effective to maintain the disk 192 seated at all times regardless of the direction of flow of fluid through said rotary valve. These valuable operating characteristics are attained by the particular design and arrangement of the vented cover 193, the diaphragm 194, the ported disk 192, the circular plates or disks 202 and 209 on the opposite sides of the diaphragm, and the cooperation of the lower end of the rod 206 with the disk 209 to provide an abutment against which the operating fluid can react to urge the disk 192 toward its seat, under certain conditions of operation, as will be explained later.

In connection with the substantial balancing of the effective fluid pressures on the rotary valve 191, the areas of the ports of the disk 192, the areas of the cover 193, counterbores 200 and 204, the circular plates 202 and 209, etc., are very important, and for this reason, the principal dimensions of these elements embodied in a highly satisfactory and operative example of the invention have been indicated in Figs. 23 to 28, inclusive.

Assuming now that the pipe 190 is the supply pipe and that operating fluid under pressure is present in the chamber 187 of the valve body 176, and assuming further that the rotary valve 191 is in the position indicated in Fig. 20, operating fluid under pressure will pass from the chamber 187 through the openings 219 and the port 218 in the disk 192 and thence into ports 222ᶜ and 222ᵈ (Fig. 22) in the base member 177, through the tubes 145ᶜ and 145ᵈ, and passages 144ᶜ and 144ᵈ to the pressure chambers 142ᶜ and 142ᵈ (Fig. 18) to exert pressure against the diaphragms 133ᶜ and 133ᵈ to effect inward movement of the pistons 134ᶜ and 134ᵈ with the consequent exertion of thrust against the ring 170 by their associated plunger 131ᶜ and 131ᵈ to produce turning impulses upon the motor shaft 117.

At the same time, operating fluid under pressure will be exhausted from the chamber 142ᵃ through passage 144ᵃ, the tube 145ᵃ, passage 223ᵃ and port 222ᵃ in the base 177, through the port 216, space 217 and port 215 of the disk 192 and thence, into the port 220 of the base member and finally discharge through the conduit 221.

Under the aforedescribed conditions of flow, the pressure in the chamber 187 will be effective upon the cover 193 and upon the disk 209 (through the vent 204ª and the slight clearance between the hexagonal opening 208 in the cover 193 and the hexagonal member 207 at the lower end of the rod or stem 206) and the diaphragm 194 will be flexed downwardly, effecting seating of the disk 202 at the lower side of the diaphragm 194, against the bottom wall of the counterbore 200, as shown in Fig. 21, the pressure readily overcoming the opposing force offered by the light springs 203 and the pressure of the exhaust fluid in the space 217. The result is that a preponderance of pressure is established to maintain the valve disk 192 on its seat 198.

Should the direction of flow of operating fluid to the valve 175 of the motor M be reversed to effect reversal of the direction of rotation of the shaft 117, such fluid will then be supplied through the conduit 221 and exhausted through the pipe 190. Consequently, fluid under pressure will be conducted through the port 220 in the base 177, and through the axial port 215 in the valve disk 192 and will act upon the underside of the diaphragm 194 causing said diaphragm to be flexed upwardly carrying the plate or disk 209 into engagement with the end face of the hexagonal member 207 carried by the rod 206. The rod 206 functions as an abutment element and upon engagement of the plate 209 therewith, further upward flexing movement of the central portion of the diaphragm 194 is positively prevented, the rod 206 taking such thrust load as may be imposed thereon by the pressure tending to move the diaphragm upwardly in a direction away from the seat 198. Inasmuch as the plate 209 and the area of the diaphragm engaged therewith are thus effectively held against upward movement, expansion of the space below the diaphragm 194 is prevented and the reaction of the operating fluid is downward upon the horizontal surfaces of the rotary disk 192 exposed to such fluid. The upper side of the plate 209 outwardly of the margins of the member 207 is subject to the pressure of the spent or exhaust operating fluid in the chamber 187, but this is insufficient to unseat the plate 209. The result again is that the disk 192 is maintained in engagement with its seat 198 by a preponderance of down pressure.

Thus, it will be seen that regardless of whether the pressure is higher in the chamber 187 of the valve body 176 than in the port 220 of the base member 177, or whether the pressure conditions are reversed, the rotary valve 191 will always be urged against its seat 198 with sufficient pressure to maintain a good seal. Without the reaction of the fluid between the diaphragm 194 and the adjacent bottom wall of the counterbore 200, the rotary disk member 192 would tend to lift away from its seat 198 and the seal between the seat and disk would be broken. This reaction or "expansible" effect of the diaphragm 194 serves, therefore, to substantially "balance" the valve disk 192 at all times and a seal is constantly maintained, without excessive pressure, between said disk and its seat 198.

While circular plates or disks have been shown on opposite sides of the diaphragm 194, it will be understood that the valve 191 will work satisfactorily without at least the lower plate 202. Also, while two springs 203 have been provided to prevent inadvertent unseating of the disk 192 when no fluid pressure is present, the force of these springs is not relied upon to maintain the constant engagement of the disk member 192 with the seat 198. However, it is preferable to employ the springs 203, although the device would still be operative without the springs and, in the latter event, if the disk 192 did leave its seat in the total absence of fluid pressure, the differential, pressure upon the restoration of fluid pressure, would be effective upon the disk 192 to quickly cause positive seating of said disk.

It will be apparent from the more or less "loose" connection provided between the hexagonal element 207 and the correspondingly shaped openings 208 in the cover member 193 of the rotary valve, that the rod 206 does not absorb any of the down thrust on the rotary valve 191. However, since the action of the "expansion" chamber 201 in the cover 193 can be balanced or adjusted in its operating efficiency by adjustment of the rod 206 relative to the diaphragm 194, the valve disk 192 can be arranged so that the effective differential pressure will not force said valve disk 192 against the base member 177 with a pressure appreciably greater than that needed to effect a seal.

The "loose" driving connection between the hexagonal member 206 and the cover member 193 also compensates for any vertical misalignment of the rod 206 with respect to the seat 198, and thus perfect sealing can be maintained at all times. It will also be apparent that any wear on either the face 197 of the disk 192 or on the seat 198 will be automatically compensated for through the seating action of the rotary valve under the pressure of the operating fluid. However, it will be understood that a film of grease is normally maintained between the face 197 and the seat 198 for assuring adequate lubrication thereof to avoid wear.

The pilot valve P shown in Fig. 13 for controlling the motor M is illustrated in complete detail in Figs. 29 to 38, inclusive. The pilot valve P includes a valve body 230 which is generally cylindrical and has a plurality of radially extending lugs 231 at the lower end thereof. The valve body 230 contains a chamber 232 and is provided with an inlet opening 233 into which one end of a supply pipe 234 is threaded. The opposite end of the pipe 234 may be connected to any suitable source of operating fluid under pressure, or it may be connected by a pipe 234ª (indicated in dot-and-dash lines in Fig. 13) with the pipe 112 to take operating fluid from the line in which the valve V is connected. The lower end of the chamber 232 is closed by a base member 235 which is provided with lugs 236 that register with the lugs 231. Bolts 237 extend through the lugs 236 and are threaded into the lugs 231 for securing the base member 235 to the valve body 230, a gasket 238 being interposed between the body and base to provide a leakproof seal.

The valve body 230 includes a cylindrical upward extension 238 which is recessed as indicated at 239. A transverse wall 240 is disposed between the chamber 232 and the recess 239. The wall 240 has an aperture 241 through which a stem or drive rod 242 extends. The lower end of the stem 242 has a hexagonal member 243, non-rotatably mounted thereon. The stem 242 has an enlargement 244 intermediate the ends thereof which is received in a recess 245 formed in the upper side of the wall 240. A recessed boss 246 extends downwardly from the wall 240 and has a conventional rubber packing 247 mounted therein for preventing leakage of fluid along the stem 242.

The stem 242 also includes an enlarged portion 248 adjacent the enlargement 244 which projects into a ball thrust bearing 249. A washer 250 rests upon the upper race of the ball bearing 249. A second washer 251 rests upon the washer 250, and the ball bearing 249 and the washers 250 and 251 are maintained in assembled relation with the stem 242 by nuts 252 mounted upon a threaded portion 253 of said stem. Thus, the ball bearing 249 is disposed on the stem 242 between the enlargement 244 and the washer 250.

The marginal portion of the washer 250 is engaged by the lower end of a gland 254 and shims 255 are disposed between the bottom wall of the recess 239 and the lower race of the ball bearing 249 for mounting the stem 242 in the desired position of vertical adjustment with respect to the rotary element 265 of the pilot valve P, for reasons which will be set forth later. A closure plate 256 overlies an outwardly extending flange 257 on the gland 254 and screws 258 extend through the plate 256 and flange 257 to retain the assembly of the shaft 242 and ball bearing 249 in the valve body 232. The upper end of the stem 242 projects through an opening 259 in the plate 256 and a manually operable control knob 260 is secured to the upper end of said stem.

The closure plate 256 has two stop pins 261 and 262 mounted thereon to limit the movement of the knob 260 in opposite directions. The plate 256 is inscribed with the word "Neutral" to indicate the neutral position of the control knob 260 and the word "Open" appears adjacent the pin 261 to indicate the direction in which the control knob 260 must be turned from its neutral position to effect operation of the motor M to open the valve V, and the word "Closed" appears adjacent the stop pin 262 to indicate the direction in which the knob 260 must be turned to effect a reverse flow of fluid from the pilot valve P to the motor M to effect closing of the valve V, all as will appear more clearly hereinafter.

Figure 31:
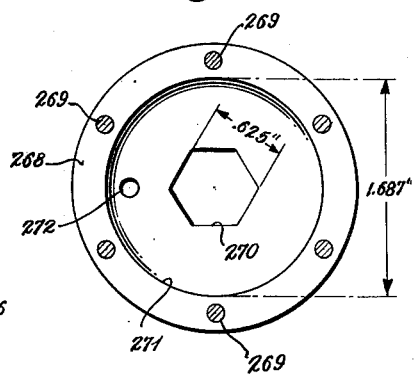
Fig. 31 is a view of the cover of the pilot disk as seen on the line 31—31 of Fig. 30.
Figure 30:
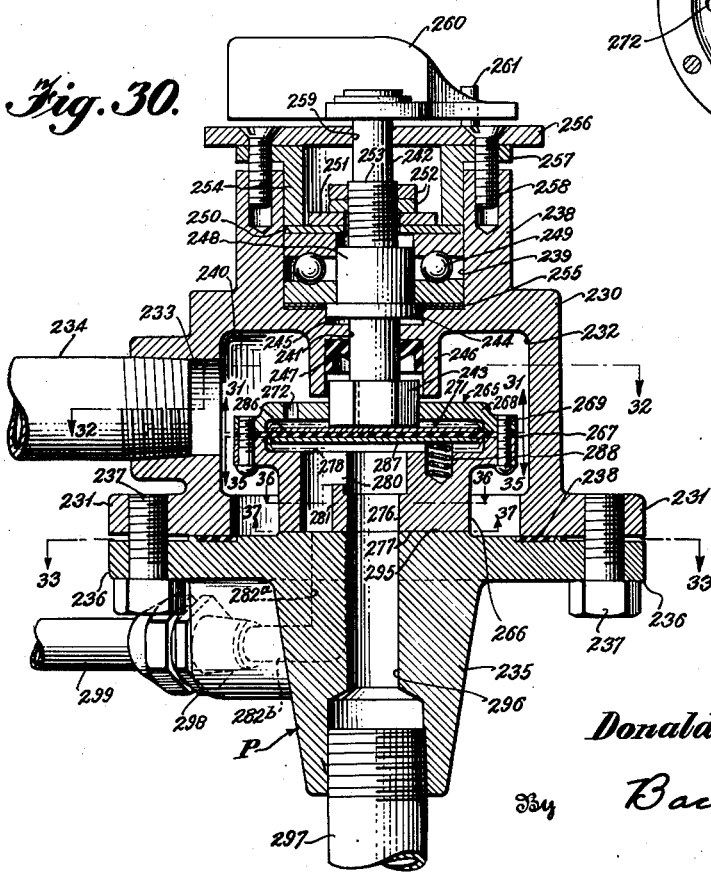
Fig. 30 is a sectional view through the pilot valve taken on the line 30—30 of Fig. 29.

The rotary valve element 265, previously mentioned, is disposed within the pressure chamber 232 and includes a disk 266, a diaphragm 267 and a cover 268, all secured together by screws 269. The details of construction of the rotary valve 265 are best illustrated in Figs. 34 to 38, inclusive. Thus, the cover member 268 is shown in Fig. 31 and Fig. 32 and includes a central hexagonal opening 270 adapted to receive the hexagonal element 243 mounted upon the lower end of the shaft 242. The cover 268 is provided with a counterbore 271 and with a vent opening 272 communicating at its lower end with said counterbore.

The porting of the pilot disk 266 is illustrated in detail in Figs. 35 to 38. As is here shown, the pilot disk 266 includes a lower cylindrical portion 275 provided with an axial port 276 extending inwardly from the lower face 277 thereof and with a counterbore 278 in its upper face, an enlarged portion 279 of the port 276 establishing communication with the counterbore 278. A radially extending passage 280 extends outwardly from the portion 279 and merges into a port 281 extending upwardly from the face 277 of the pilot disk 275. The port 276—279, passage 280 and port 281 cooperate to form an exhaust passageway through the valve disk 275.

The pilot disk 266 also has two pressure ports 282 and 283 extending upwardly from the face 277, and these ports communicate with radial passages 284 and 285, respectively, extending inwardly from the periphery of the cylindrical portion 275. The radial ports 284 and 285 extend upon radii disposed 72° to either side of a radial line passing through the exhaust port 276—279—280—281, as indicated in Fig. 35. The ports 281, 282 and 283 are all located the same distance from the axis of the port 276, as will be apparent from Fig. 37.

A circular brass plate or disk 286 is disposed in the counterbored portion 271 of the cover 268 between the diaphragm 267 and the lower face of the hexagonal member 243, and a similar plate or disk 287 is disposed in the counterbore 278 at the lower side of said diaphragm. Springs 288 are received in holes 289 in the pilot disk 266 and engage the under side of the plate 287 to urge the same upwardly toward the diaphragm 267.

The lower face 277 of the pilot disk 266 is adapted to engage a lapped seat 295 formed upon the base member 235. The base member 235 is provided with an axial port 296 which is in constant registration with the axial port 276 of the pilot disk 266. The port 296 is enlarged and threaded at its lower end for the reception of one end of a drain pipe 297. The base member 235 is further provided with ports 282ª and 283ª, which are spaced upon radii 72° apart, as indicated in Fig. 33. The ports 282ª and 283ª are also drilled upon the same radius as the ports 281, 282 and 283 of the pilot disk 266 in order to insure proper registration therewith. The port 282ª communicates with a radially extending passage 282ᵇ, which is enlarged and threaded at its outer end for the reception of a conventional fitting 298 having one end of a conduit 299 connected therewith. The opposite end of the conduit 299 is connected with the pipe 190 (see Fig. 13) communicating with the chamber 187 of the motor valve 175. The port 283ª communicates with a radial passage 283ᵇ, which is enlarged and threaded at its outer end for the reception of a conventional fitting 300 having one end of the conduit 221 connected therewith.

It will be apparent from Fig. 32, that when the control knob 260 is in the "neutral" position, all communication between the pressure chamber 232 and the ports 282ª and 283ª in the base member 235 will be blocked so that no flow of operating fluid will occur in either direction through the conduits 299 and 221. This means, of course, that the motor M will be "locked" against rotation in either direction and will hold the gate 113 in whatever position it occupied at the time that the control knob was moved to "neutral" position. Rotation of the control knob 260 to the "closed" position where it engages the pin 262 to effect closing of the valve, will position the pressure port 283 in registration with the port 283ª in the base 235 and operating fluid under pressure will be delivered through the conduit 221 to the valve motor 175 to effect rotation of the motor shaft 147 in one direction. Simultaneously, the exhaust port 281 will register with the port 282ª and spent operating fluid will be returned from the motor valve 175 through the conduit 299 and discharged from the pilot valve P through the pipe 297. The control knob 260 may be left in the "closed" position to maintain the valve V tightly closed, the motor M then being subjected to a stall load and automatically discontinuing operation after the valve V has been fully closed. If desired, of course, the operator can return the knob 260 to its "neutral" position before the gate 113 is closed to effect only partial closing of the valve V. Complete opening or any desired degree of increased partial opening of the valve V can then be effected by positioning the control knob 260 in its "open" position against the stop pin 261, whereupon the port 282 of the pilot disk 266 will register with the port 282ª of the base 235 to supply fluid to the valve motor 175 through the conduit 299 and the exhaust port 281 will register with the port 283ª to effect exhaust of operating fluid from the motor valve 175 through the conduit 221. The exhaust or spent operating fluid is then discharged through the pipe 297.

The pilot valve P is designed and operates upon the same principles to obtain pressure "balancing" thereof as the rotary member 191 of the motor valve 175. Here again, the area of the vented cover 268, the ports of the pilot disk 266, the counterbores 271 and 278, and the disks 286 and 287 are quite important and their dimensions have been indicated in Figs. 31 and 34 to 38, inclusive, of the drawings. These dimensions are those of an operative example of a valve that has proved itself to be highly satisfactory in use.

The stem 242, like the rod or stem 206, is adjustable axially relative to the diaphragm 267 so that the hexagonal portion 274 thereof can be adjusted vertically with respect to said diaphragm to position the lower face thereof in the desired plane for aiding in obtaining the desired balance and to provide a fixed abutment for the diaphragm, such axial adjustment being effected through the shims 255 and the gland 254. Needless to say, the stem does not restrain movement of the rotary valve 265 in a seating direction, and said valve is so "balanced" that the pilot disk 266 remains seated at all times and only a slight force is required to effect rotation of the stem 242 by turning the knob 260 even when fluid pressures in excess of 300 lbs. per sq. inch are employed.

It will be understood that the motor M is not limited in its use to operating gate valves, but can be used to operate rotary valves, and other devices where freedom from overrunning, due to inertia of the parts, is undesirable and all "creeping" of the motor after the supply of operating fluid thereto has been cut off is to be avoided.

Although the invention has been particularly shown and described with respect to three forms of motors, it is contemplated that various changes and modifications may be made in the structure shown without departing from the invention and it is intended to cover such modifications and changes as fairly come within the scope of the claims.

I claim:

1. In a fluid motor: a housing having a plurality of radially disposed cylinders; pistons in said cylinders; a shaft rotatably mounted in said housing and having an eccentric portion intermediate its ends engageable by said pistons, said shaft having a valve pin extending centrally of the shaft and beyond the end thereof; means closing the ends of said cylinders; a flexible diaphragm at the end of each cylinder adapted to engage the piston and cooperate with the cylinder closure means to form a pressure chamber outwardly of the diaphragm, said housing having a valve chamber provided with an inlet passage and an exhaust passage; a rotary disk valve mounted on the valve pin in said chamber between the inlet and outlet passages; and individual fluid passages connecting the respective pressure chambers with said valve, said valve being adapted to rotate with the valve pin and shaft for successively connecting the individual fluid passages with the inlet and outlet passages, said valve pin being rotatably adjustable with relation to the remainder of the shaft for adjustably positioning the valve to control the flow of fluid to and from the respective pressure chambers and thereby control the direction of rotation of the shaft.

2. In a fluid motor: a housing having a plurality of radially disposed cylinders; pistons in said cylinders; means closing the outer ends of said cylinders and providing a pressure chamber outwardly of each of said pistons; a shaft rotatably mounted in said housing; means for converting reciprocating motion of said pistons into rotary motion of said shaft, said shaft having a valve pin drivingly connected therewith and extending centrally of said shaft and beyond the end thereof, said housing having a valve chamber provided with an inlet passage and an exhaust passage; a rotary valve drivingly connected with said valve pin and interposed in said valve chamber between said inlet and outlet passages; and individual fluid passages connecting the respective pressure chambers with said valve chamber, said valve being adapted to rotate with said valve pin and shaft for successively connecting said individual fluid passages with said inlet and outlet passages, said valve pin being rotatably adjustable with relation to said shaft for adjustably positioning the valve to control the admission and exhaust of fluid to and from the respective pressure chambers.

3. In a fluid motor: a housing having a cylinder; a plunger in said cylinder; a shaft rotatably mounted in said housing; means for converting reciprocating motion of said plunger into rotative motion of said shaft, said shaft having a valve pin extending centrally of the shaft and beyond the end thereof; means closing the outer end of said cylinder; a flexible diaphragm at the end of said cylinder adapted to engage the plunger and cooperate with the cylinder closure means to form a pressure chamber outwardly of the diaphragm, said housing having a valve chamber provided with an inlet and an outlet; a rotary disk valve operable by the valve pin in said chamber between the inlet and outlet; and individual fluid passages connecting the respective pressure chambers with said valve, said valve being adapted to rotate with the valve pin and shaft for successively connecting the individual fluid passages with the inlet and outlet, said valve pin being rotatably adjustable relative to the remainder of the shaft for adjustably positioning the valve to control the flow of fluid to and from the respective pressure chambers and thereby control the direction of rotation of the shaft.

4. In a fluid motor: a housing having a plurality of cylinders; a plunger in each of said cylinders; means closing the outer end of said cylinders and providing a pressure chamber outwardly of each of said pistons; a shaft rotatably mounted in said housing; means for converting reciprocating motion of said plungers into rotary motion of said shaft, said shaft having a valve pin extending centrally of said shaft and beyond the end thereof, said housing having a valve chamber provided with an inlet and an outlet; a rotary disk valve operable by said valve pin interposed in said chamber between said inlet and outlet; and fluid passage means connecting said pressure chambers with said valve chamber, said valve being adapted to rotate with the valve pin and shaft for successively connecting the fluid passage means with said inlet and outlet, said valve pin being rotatably adjustable relative to said shaft for adjustably varying the angular positioning of said valve relative to said fluid passage means.

5. A fluid motor comprising: a housing having a plurality of cylinders; a plunger in each of said cylinders; means closing the outer end of said cylinders and providing a pressure chamber outwardly of each of said plungers; a shaft rotatably mounted in said housing; means for converting reciprocating motion of said plungers into rotary motion of said shaft; a rod arranged with its axis disposed in alignment with the axis of said shaft and detachably connected to said shaft, said housing having a valve chamber provided with an inlet and an outlet and one end of said rod extending into said valve chamber; a ported rotary valve in said valve chamber interposed between said inlet and outlet; individual fluid passages connecting the respective pressure chambers with said valve chamber; and means drivingly interconnecting said valve and said one end of said rod, whereby to effect rotation of said valve for successively connecting the individual fluid passages with said inlet and outlet.

6. A fluid motor comprising: a housing having a plurality of cylinders; plunger means in each of said cylinders; means closing the outer end of said cylinders and providing a pressure chamber outwardly of said plunger means; a shaft rotatably mounted in said housing; means for converting reciprocating motion of said plunger means into rotary motion of said shaft; a rod arranged with its axis disposed in alignment with the axis of said shaft and detachably connected to said shaft, said housing having a valve chamber provided with an inlet and an outlet and one end of said rod extending into said valve chamber; a ported rotary valve in said valve chamber interposed between said inlet and outlet; individual fluid passages connecting the respective pressure chambers with said valve chamber; means drivingly interconnecting said valve and said one end of said rod, whereby to effect rotation of said valve for successively connecting the individual fluid passages with said inlet and outlet; and means for rotatably adjusting said rod relative to said shaft.

7. A fluid motor comprising: a housing having a plurality of cylinders; plunger means in each of said cylinders; means closing the outer end of said cylinders and providing a pressure chamber outwardly of said plunger means; a shaft rotatably mounted in said housing; means for converting reciprocating motion of said plunger means into rotary motion of said shaft; a rod arranged with its axis disposed in alignment with the axis of said shaft, said housing having a valve chamber provided with an inlet and an outlet; a ported rotary valve in said valve chamber interposed between said inlet and outlet; individual fluid passages connecting the respective pressure chambers with said valve chamber; means drivingly interconnecting said valve and rod; and common means connecting said rod to said shaft and for rotatably adjusting said rod relative to said shaft, whereby to effect rotation of said valve for successively connecting the individual fluid passages with said inlet and outlet.

8. A fluid motor, comprising: a housing having a plurality of cylinders; a plunger in each of said cylinders; means closing the outer end of said cylinders and providing a pressure chamber outwardly of each of said plungers; a shaft rotatably mounted in said housing; means for converting reciprocating motion of said plungers into rotary motion of said shaft, said shaft having an axial passage formed therein, a rod or stem disposed in said passage, said housing having a valve chamber provided with an inlet and an outlet; a rotary disk valve interposed in said valve chamber between said inlet and said outlet; fluid passage means connecting said pressure chambers with said valve chamber; means drivingly interconnecting said rod or stem and valve to rotate said valve for successively connecting said fluid passage means with said inlet and outlet; means for adjusting said rod or stem longitudinally with respect to said disk valve; and means for rotatably adjusting said rod or stem relative to said shaft for adjustably positioning said valve to control the flow of operating fluid to and from said pressure chambers.

9. A fluid motor, comprising: a housing having a plurality of cylinders; a plunger in each of said cylinders; means closing the outer end of said cylinders and providing a pressure chamber outwardly of each of said plungers; a shaft rotatably mounted in said housing; means for converting reciprocating motion of said plungers into rotary motion of said shaft, said shaft having an axial passage extending therethrough; a rod in said passage, said housing having a valve chamber provided with an inlet and an outlet; a ported rotary disk valve interposed in said chamber between said inlet and outlet; individual fluid passages connecting said pressure chambers with said valve chamber; means serving to drivingly interconnect said rod and shaft and to rotatably adjust said rod relative to said shaft; means for adjusting said rod longitudinally relative to said shaft; and means drivingly interconnecting said rod and valve to effect rotation of said valve simultaneously with said shaft for successively connecting said individual fluid passages with said inlet and outlet.

10. A device comprising: a housing having a central chamber forming a closed reservoir for a lubricant and a plurality of cylinders extending radially from said chamber; a piston and plunger rod in each of said cylinders adapted to be lubricated by said lubricant; means closing the outer end of said cylinders and providing a pressure chamber outwardly of each of said pistons; a transverse wall forming a closure for the inner end of said cylinders; a boss on said walls forming a guide for said plunger rods, said walls having lubricant openings establishing communication between said central chamber and cylinders; a shaft rotatably mounted in said housing and means for converting reciprocating motion of said pistons into rotary motion of said shaft.

11. A fluid motor, comprising: a housing having a plurality of cylinders; plunger means in each of said cylinders; means closing the outer end of said cylinders and providing a pressure chamber outwardly of said plunger means; a shaft rotatably mounted in said housing; means for converting reciprocating motion of said plunger means into rotary motion of said shaft, said housing having a valve chamber provided with an inlet, an outlet and a valve seat between said inlet and outlet; means providing individual passages connecting the respective pressure chambers with said valve chamber; a ported rotary valve in said valve chamber interposed between said inlet and outlet, said rotary valve including diaphragm means having the opposite sides thereof subject to the pressures in said inlet and outlet, respectively, and arranged to maintain said valve seated at all times; abutment means for said diaphragm for limiting flexing of said diaphragm in a direction away from said seat; and means drivingly interconnecting said shaft and valve.

12. A fluid motor, comprising: a housing having a plurality of cylinders; plunger means in each of said cylinders; means closing the outer end of said cylinders and providing a pressure chamber outwardly of said plunger means; a shaft rotatably mounted in said housing; means for converting reciprocating motion of said plunger means into rotary motion of said shaft, said housing having a valve chamber provided with an inlet and an outlet; means providing individual passages connecting the respective pressure chambers with said valve chamber; a ported rotary valve in said valve chamber interposed between said inlet and outlet, said rotary valve including diaphragm means having the opposite sides thereof subject to the pressures in said inlet and outlet, respectively, and arranged to maintain said valve seated at all times; a rod axially aligned with said shaft and driven thereby, said rod having one end thereof in confronting relation with one side of said diaphragm and adapted to serve as an abutment to limit flexing of said diaphragm toward said rod; and mean drivingly interconnecting said rod and valve.

13. A fluid motor, comprising: a housing having a plurality of cylinders; plunger means in each of said cylinders; means closing the outer end of said cylinders and providing a pressure chamber outwardly of said plunger means; a shaft rotatably mounted in said housing; means for converting reciprocating motion of said plunger means into rotary motion of said shaft, said housing having a valve chamber provided with an inlet and an outlet; means providing individual passages connecting the respective pressure chambers with said valve chamber; a ported rotary valve in said valve chamber interposed between said inlet and outlet, said rotary valve including diaphragm means having the opposite sides thereof subject to the pressures in said inlet and outlet, respectively, and arranged to maintain said valve seated at all times; a rod axially aligned with said shaft and driven thereby, said rod having one end thereof in confronting relation with one side of said diaphragm and adapted to serve as an abutment to limit flexing of said diaphragm toward said rod; means for adjusting said one end of said rod relative to said diaphragm; and means drivingly interconnecting said rod and valve.

14. A fluid motor, comprising: a housing having a plurality of cylinders; plunger means in each of said cylinders; means closing the outer end of said cylinders and providing a pressure chamber outwardly of said plunger means; a shaft rotatably mounted in said housing; means for converting reciprocating motion of said plunger means into rotary motion of said shaft, said housing having a valve chamber provided with an inlet and an outlet; means providing individual passages connecting the respective pressure chambers with said valve chamber; a ported rotary valve in said valve chamber interposed between said inlet and outlet, said rotary valve including diaphragm means having the opposite sides thereof subject to the pressures in said inlet and outlet, respectively, and arranged to maintain said valve seated at all times; a rod axially aligned with said shaft and driven thereby, said rod having one end thereof in confronting relation with one side of said diaphragm and adapted to serve as an abutment to limit flexing of said diaphragm toward said rod; means for adjusting said one end of said rod relative to said diaphragm; means for rotatably adjusting said rod relative to said shaft; and means drivingly interconnecting said rod and valve.

15. A fluid motor, comprising: a housing having a plurality of cylinders; plunger means in each of said cylinders; means closing the outer end of said cylinders and providing a pressure chamber outwardly of said plunger means; a shaft rotatably mounted in said housing; means between said plunger means and shaft for converting reciprocating motion of said plunger means into rotary motion of said shaft; a stem disposed in axial alignment with said shaft, said housing having a valve chamber provided with an inlet and an outlet; means providing individual passages connecting the respective pressure chambers with said valve chamber; a rotary valve in said valve chamber for controlling the supply and exhaust of fluid to said individual passages, said rotary valve including a ported disk having exhaust and pressure ports, a diaphragm overlying one face of said disk, a cover overlying said diaphragm, said cover being recessed to provide a first chamber between said cover and diaphragm; and means drivingly interconnecting said cover and one end of said stem, with said one end of said stem extending through said cover into said first chamber to form an abutment for said diaphragm.

16. A fluid motor, as defined in claim 15, including means for longitudinally adjusting said one end of said stem relative to said diaphragm.

17. A fluid motor, comprising: a housing having a plurality of cylinders; plunger means in each of said cylinders; means closing the outer end of said cylinders and providing a pressure chamber outwardly of said plunger means; a shaft rotatably mounted in said housing; means between said plunger means and shaft for converting reciprocating motion of said plunger means into rotary motion of said shaft, a stem disposed in axial alignment with said shaft, said housing having a valve chamber provided with an inlet and an outlet; means providing individual passages connecting the respective pressure chambers with said valve chamber; a rotary valve in said valve chamber for controlling the supply and exhaust of fluid to said individual passages, said rotary valve including a ported disk having exhaust and pressure ports, a diaphragm overlying one face of said disk, a cover overlying said diaphragm, said cover being recessed to provide a first chamber between said cover and diaphragm, a plate in said first chamber disposed between said cover and diaphragm, said disk also being recessed to provide a second chamber between said disk and diaphragm; means drivingly interconnecting said cover and said stem, with said stem extending through said cover into said first chamber with the end thereof in predetermined spaced relation to said diaphragm.

18. A fluid motor, comprising: a housing having a plurality of cylinders; plunger means in each of said cylinders; means closing the outer end of said cylinders and providing a pressure chamber outwardly of said plunger means; a shaft rotatably mounted in said housing; means between said plunger means and shaft for converting reciprocating motion of said plunger means into rotary motion of said shaft, said shaft having a longitudinal bore extending therethrough; a stem disposed in said bore, said housing having a valve chamber provided with an inlet and an outlet; means providing individual passages connecting the respective pressure chambers with said valve chamber; a rotary valve in said valve chamber for controlling the supply and exhaust of fluid to said individual passages, said rotary valve including a ported disk having exhaust and pressure ports, a diaphragm overlying one face of said disk, a cover overlying said diaphragm, said cover being recessed to provide a first chamber between said cover and diphragm, a first plate in said first chamber disposed between said cover and diaphragm, said disk also being recessed to provide a second chamber between said disk and diaphragm, a second plate in said second chamber, and spring means between said second plate and said disk normally urging said second plate toward said diaphragm; means drivingly interconnecting said cover and one end of said stem, said one end of said stem extending through said cover into said first chamber in confronting relation to said first plate, and the opposite end of said stem including a flat extension; means engaging said extension for longitudinally adjusting said one end of said stem relative to said diaphragm; and adjustable means engaging the opposite sides of said flat extension of said stem and disposed to one side of the axis of said stem for effecting angular adjustment of said stem relative to said shaft.

19. A valve comprising: a housing having a chamber provided with inlet and outlet passage means; a rotary valve in said chamber interposed between said inlet and outlet passage means including a ported disk, and a diaphragm having one side thereof overlying one face of said disk; a stem arranged on the opposite side of said diaphragm; means drivingly interconnecting said stem and rotary valve; and abutment means on the stem side of said diaphragm engageable by the central portion of said diaphragm.

20. A valve comprising: a housing having a chamber provided with inlet and outlet passage means; a rotary valve in said chamber interposed between said inlet and outlet passage means including a ported disk, a diaphragm overlying one face of said disk, and a cover overlying said diaphragm, said cover being recessed to provide a first chamber between said cover and diaphragm, said disk also being recessed to provide a second chamber disposed between said diaphragm and disk; a stem arranged in substantially axial alignment with said rotary valve, said cover having an opening and said stem extending through said opening into said first chamber; means drivingly interconnecting said stem and rotary valve; plate means in said first chamber operatively associated with said stem to serve as an abutment; and means maintaining said stem in a predetermined position of longitudinal adjustment with respect to said diaphragm.

21. A valve comprising: a housing having a chamber provided with inlet and outlet passage means; a rotary valve in said chamber interposed between said inlet and outlet passage means including a ported disk, a diaphragm overlying one face of said disk, a cover overlying said diaphragm, and a plate disposed between said diaphragm and cover; a stem arranged in substantially axial alignment with said rotary valve, said cover having an opening and one end of said stem projecting through said opening into juxtaposition with said plate; means drivingly interconnecting said stem and rotary valve; and means maintaining said one end of said stem in a predetermined position of longitudinal adjustment with respect to said diaphragm.

22. A valve comprising: a body provided with a chamber extending inwardly from one face thereof; a ported base member forming a closure for said chamber; a rotary valve in said chamber including a ported disk, seated upon said base member, a diaphragm overlying one face of said disk, a cover overlying said diaphragm, said cover being recessed to provide a first chamber between said cover and diaphragm, a first plate in said first chamber disposed between said diaphragm and cover, said disk also being recessed to provide a second chamber between said diaphragm and disk, a second plate in said second chamber, and spring means interposed between said disk and second plate and normally urging said second plate toward said diaphragm; a stem arranged in substantially axial alignment with said rotary valve, said cover having an opening and one end of said stem projecting through said opening into said first chamber; means drivingly interconnecting said stem and rotary valve; and means including an antifriction bearing for adjusting said one end of said stem longitudinally with respect to said diaphragm.

23. A fluid motor, comprising: a housing having a plurality of cylinders; plunger means in each of said cylinders; means closing the outer end of said cylinders and providing a pressure chamber outwardly of said plunger means; a shaft rotatably mounted in said housing; means for converting reciprocating motion of said plunger means into rotary motion of said shaft, said housing having a valve chamber provided with an inlet and an outlet; means providing individual passages connecting the respective pressure chambers with said valve chamber; a ported rotary valve in said valve chamber interposed between said inlet and outlet, said rotary valve including diaphragm means having the opposite sides thereof subject to the pressures in said inlet and outlet, respectively, and arranged to maintain said valve seated at all times; a rod axially aligned with said shaft, said rod having one end thereof in confronting relation with one side of said diaphragm and adapted to serve as an abutment to limit flexing of said diaphragm toward said rod; and means drivingly interconnecting said shaft and valve.

24. A valve comprising: a housing having a chamber provided with inlet and outlet passage means; a rotary valve in said chamber interposed between said inlet and outlet passage means including a ported disk, and a diaphragm having one side thereof overlying one face of said disk; a stem arranged in substantially axial alignment with said rotary valve; means drivingly interconnecting said stem and rotary valve; and abutment means on opposite sides of said diaphragm engageable by the central portion of said diaphragm.

25. A device comprising: a housing having a central chamber and a plurality of cylinders extending radially from said chamber; a cup-shaped piston in each of said cylinders, each of said pistons having a skirt; a rod connected with each of said pistons; means closing the outer end of said cylinders and providing a pressure chamber outwardly of each of said pistons; a transverse wall forming a closure for the inner end of said cylinders; a boss on each of said walls projecting outwardly therefrom and receivable in a piston skirt and forming a guide for said plunger rods, said walls having openings establishing communication between said central chamber and the interior of said cylinders; a shaft rotatably mounted in said housing; and means for converting reciprocating motion of said pistons into rotary motion of said shaft.

26. A device comprising: a housing having a valve chamber provided with an inlet and an outlet, said housing also having a central chamber in non-communicating relation with said valve chamber; a plurality of cylinders extending radially from said central chamber; a piston and plunger rod in each of said cylinders; means closing the outer end of said cylinders and providing a pressure chamber outwardly of each of said pistons; passage means connecting said pressure chambers with said valve chamber; a transverse wall forming a closure for the inner end of said cylinders; a boss on said walls forming a guide for said plunger rods, said walls having openings establishing communication between said central chamber and the interior of said cylinders; a shaft rotatably mounted in said housing; and means for converting reciprocating motion of said pistons into rotary motion of said shaft.

27. A valve comprising: a housing having a chamber provided with a seat, and inlet and outlet passage means; a rotary valve in said chamber interposed between said inlet and outlet passage means including a ported disk, one face of said disk engaging said seat, and diaphragm means having one side thereof overlying the other face of said disk; a stem arranged in alignment with said rotary valve; means drivingly interconnecting said stem and rotary valve; and abutment means on the opposite side of said diaphragm means engageable by said diaphragm means.

28. A valve comprising: a housing having a chamber provided with a seat, and inlet and outlet passage means; a rotary valve in said chamber interposed between said inlet and outlet passage means including a ported disk, one face of said disk engaging said seat, and diaphragm means having one side thereof overlying the other face of said disk; a stem arranged in alignment with said rotary valve; means drivingly interconnecting said stem and rotary valve; abutment means on the opposite side of said diaphragm means engageable by said diaphragm means; and means for adjusting said abutment means relative to said diaphragm means.

29. A valve comprising: a housing having a chamber provided with a seat, and inlet and outlet passage means; a rotary valve in said chamber interposed between said inlet and outlet passage means including a ported disk, one face of said disk engaging said seat, and diaphragm means having one side thereof overlying the other face of said disk; a stem on the opposite side of said diaphragm means arranged in alignment with said rotary valve; means drivingly interconnecting said stem and rotary valve; and abutment means on said stem engageable by said diaphragm means.

30. A valve as defined in claim 29, including means for longitudinally adjusting said stem relative to said diaphragm means.

31. A valve as defined in claim 29, including means for rotatably adjusting said rotary valve relative to said housing to vary the initial position of said rotary valve relative to the inlet and outlet passage means of said housing.

32. A valve comprising: a housing having a chamber provided with inlet and outlet passage means; a rotary valve in said chamber interposed between said inlet and outlet passage means including a ported disk, a diaphragm overlying one face of said disk, a cover overlying said diaphragm, and a plate disposed between said diaphragm and cover; and a stem arranged in substantially axial alignment with said rotary valve, said cover having an opening and one end of said stem projecting through said opening into juxtaposition with said plate.

33. A valve as defined in claim 32, including means maintaining said one end of said stem in a predetermined position of longitudinal adjustment with respect to the plate.

34. A valve comprising: a housing having a chamber provided with inlet and outlet passage means; a rotary valve in said chamber interposed between said inlet and outlet passage means including a ported disk, a flexible diaphragm overlying one face of said disk, and a cover overlying said diaphragm, said cover being recessed to provide a substantially circular chamber between said cover and diaphragm; a stem; means drivingly interconnecting said stem and rotary valve; plate means in said last-mentioned chamber; and abutment means engageable by said plate means for limiting flexing movement of said diaphragm in one direction.

35. A valve as defined in claim 34, in which the plate means is a disk slightly smaller in diameter than the substantially circular chamber.

36. A valve as defined in claim 34, in which the disk is recessed to provide a substantially circular chamber between the diaphragm and disk.

37. A valve as defined in claim 34, in which the disk is recessed to provide a second substantially circular chamber between the diaphragm and disk, and a circular plate of slightly smaller diameter than said second chamber is disposed in said second chamber.

38. A valve, comprising: a housing having a valve chamber provided with an inlet and an outlet; a ported rotary valve in said chamber interposed between said inlet and outlet, said rotary valve including diaphragm means having the opposite sides thereof subject to the pressures in said inlet and outlet, respectively, and arranged to maintain said valve seated at all times; a shaft; a rod axially aligned with said shaft and driven thereby, said rod having one end thereof in confronting relation with one side of said diaphragm and adapted to serve as an abutment to limit flexing of said diaphragm toward said rod; means for adjusting said one end of said rod relative to said diaphragm; means for rotatably adjusting said rod relative to said shaft; and means drivingly interconnecting said rod and valve.

39. A fluid motor, comprising: a housing having a plurality of cylinders; a plunger slidably mounted in each of said cylinders; means closing the outer end of said cylinders and providing a pressure chamber outwardly of the respective plungers; a shaft having its axis arranged substantially perpendicular to the axis of the respective plungers and being rotatably mounted in said housing; means for converting reciprocating motion of said plungers into rotary motion of said shaft, said housing having a valve chamber provided with an inlet and an outlet; means providing individual passages connecting the respective pressure chambers with said valve chamber; a ported rotary valve in said valve chamber interposed between said inlet and outlet, said rotary valve including diaphragm means having the opposite sides thereof subject to the pressures in said inlet and outlet, respectively, and arranged to maintain said valve seated at all times; a rod axially aligned with said shaft and driven thereby, said rod having one end thereof in confronting relation with one side of said diaphragm and adapted to serve as an abutment to limit the flexing of said diaphragm toward said rod; and means drivingly interconnecting said rod and valve.

40. A valve, comprising: a housing having a valve chamber provided with an inlet and an outlet; a ported rotary valve in said valve chamber interposed between said inlet and outlet, said rotary valve including diaphragm means having the opposite sides thereof subject to the pressures in said inlet and outlet, respectively, and arranged to maintain said valve seated at all times; a shaft; a rod axially aligned with said shaft and driven thereby, said rod having one end thereof in confronting relation with one side of said diaphragm and arranged to serve as an abutment to limit flexing of said diaphragm toward said rod; and means drivingly interconnecting said rod and valve.

DONALD G. GRISWOLD.

REFERENCES CITED

The following references are of record in the file of this patent:

UNITED STATES PATENTS

| Number | Name | Date |
| --- | --- | --- |
| 196,070 | Brotherhood | Oct. 16, 1877 |
| 242,875 | Brotherhood | June 14, 1881 |
| 717,445 | Nestius | Dec. 30, 1902 |
| 820,345 | Brousseau | May 8, 1906 |
| 1,488,528 | Cardini | Apr. 1, 1924 |
| 1,957,697 | Conway | May 8, 1934 |

FOREIGN PATENTS

| Number | Country | Date |
| --- | --- | --- |
| 362,522 | Germany | Oct. 28, 1922 |
| 713,727 | France | Aug. 17, 1931 |